US009454145B2

(12) United States Patent
Collingwood et al.

(10) Patent No.: US 9,454,145 B2
(45) Date of Patent: Sep. 27, 2016

(54) ANALOGUE MEASUREMENT PROBE FOR A MACHINE TOOL APPARATUS AND METHOD OF OPERATION

(75) Inventors: David Collingwood, Stroud (GB); Robert John Bragg, Stroud (GB)

(73) Assignee: RENISHAW PLC, Wotton-under-Edge (GB)

( * ) Notice: Subject to any disclaimer, the term of this patent is extended or adjusted under 35 U.S.C. 154(b) by 277 days.

(21) Appl. No.: 13/979,711

(22) PCT Filed: Jan. 19, 2012

(86) PCT No.: PCT/GB2012/000043
§ 371 (c)(1),
(2), (4) Date: Jul. 15, 2013

(87) PCT Pub. No.: WO2012/098353
PCT Pub. Date: Jul. 26, 2012

(65) Prior Publication Data
US 2013/0298416 A1 Nov. 14, 2013

Related U.S. Application Data

(60) Provisional application No. 61/438,790, filed on Feb. 2, 2011.

(30) Foreign Application Priority Data

Jan. 19, 2011 (EP) .................................... 11250059
Jan. 19, 2011 (EP) .................................... 11250060

(51) Int. Cl.
*G01B 5/012* (2006.01)
*G01B 7/012* (2006.01)
(Continued)

(52) U.S. Cl.
CPC ............. *G05B 19/182* (2013.01); *G01B 5/012* (2013.01); *G01B 7/00* (2013.01); *G01B 7/012* (2013.01)

(58) Field of Classification Search
CPC ........ G01B 5/012; G01B 7/00; G01B 7/012; G05B 19/18; G05B 19/182
USPC .................. 33/556, 557, 558, 559, 560, 561
See application file for complete search history.

(56) References Cited

U.S. PATENT DOCUMENTS

| 3,824,893 A | 7/1974 | Sartorio |
| 3,945,124 A | 3/1976 | Jacoby et al. |

(Continued)

FOREIGN PATENT DOCUMENTS

| CN | 1457422 A | 11/2003 |
| CN | 1688862 A | 10/2005 |

(Continued)

OTHER PUBLICATIONS

Apr. 20, 2011 European Search Report issued in European Patent Application No. 11 25 0059.

(Continued)

*Primary Examiner* — R. A. Smith
(74) *Attorney, Agent, or Firm* — Oliff PLC

(57) ABSTRACT

An analogue probe for a machine tool apparatus, which includes a probe body, a stylus member movably secured to the probe body and a sensor that measures the extent of displacement of the stylus member relative to the probe body, in which the sensor is contained within a chamber in the probe body. The analogue probe further includes a vent between the chamber and the outside of the probe body, configured such that, when the vent is open, the pressure within the chamber can equalize with the analogue probe's operating environment's pressure, and is further configured such that the vent's opening to the outside of the probe body can be closed so as to seal the chamber and the sensor from external contaminants during operation of the analogue probe.

20 Claims, 12 Drawing Sheets

(51) Int. Cl.
    *G05B 19/18*     (2006.01)
    *G01B 7/00*     (2006.01)

(56) References Cited

U.S. PATENT DOCUMENTS

| | | | |
|---|---|---|---|
| 4,084,323 A | | 4/1978 | McMurtry |
| 4,153,998 A | | 5/1979 | McMurtry |
| 4,187,614 A | | 2/1980 | Abiru et al. |
| 4,250,895 A | | 2/1981 | Lees |
| 4,253,240 A | | 3/1981 | Feichtinger |
| 4,408,159 A | * | 10/1983 | Prox .................. G01V 3/101 324/207.12 |
| 4,441,257 A | | 4/1984 | Golinelli et al. |
| 4,455,754 A | | 6/1984 | Benjamin |
| 4,471,529 A | | 9/1984 | Kohler |
| 4,516,327 A | | 5/1985 | Kanda et al. |
| 4,578,873 A | | 4/1986 | Klingler et al. |
| 4,701,704 A | | 10/1987 | Fukuyoshi et al. |
| 4,882,848 A | | 11/1989 | Breyer et al. |
| 4,910,879 A | | 3/1990 | Golinelli et al. |
| 4,937,948 A | | 7/1990 | Herzog et al. |
| 5,018,278 A | * | 5/1991 | Aehnelt ............... G01B 7/012 33/503 |
| 5,048,194 A | | 9/1991 | McMurtry |
| 5,209,131 A | | 5/1993 | Baxter |
| 5,222,304 A | | 6/1993 | Butler |
| 5,259,122 A | | 11/1993 | Ichiba et al. |
| 5,299,361 A | | 4/1994 | Fiedler |
| 5,327,657 A | | 7/1994 | Hajdukiewicz et al. |
| 5,345,689 A | | 9/1994 | McMurtry et al. |
| 5,357,684 A | | 10/1994 | Lindner et al. |
| 5,390,424 A | | 2/1995 | Butter et al. |
| 5,414,940 A | * | 5/1995 | Sturdevant ............. G01B 7/001 33/559 |
| 5,623,766 A | | 4/1997 | Ruck et al. |
| 5,727,326 A | | 3/1998 | Mies et al. |
| 5,755,038 A | | 5/1998 | McMurtry |
| 5,829,932 A | | 11/1998 | Kis et al. |
| 5,979,070 A | | 11/1999 | Lau |
| 6,131,300 A | | 10/2000 | Mies |
| 6,291,822 B1 | | 9/2001 | Umemoto et al. |
| 6,430,833 B1 | | 8/2002 | Butter et al. |
| 6,449,861 B1 | | 9/2002 | Danielli et al. |
| 6,487,897 B1 | | 12/2002 | Fujii et al. |
| 6,683,780 B2 | | 1/2004 | Thomas et al. |
| 6,854,195 B2 | | 2/2005 | Jordil et al. |
| 6,907,673 B2 | | 6/2005 | Zanier et al. |
| 6,938,353 B2 | | 9/2005 | Rouge et al. |
| 7,036,239 B2 | | 5/2006 | Jordil et al. |
| 7,086,170 B2 | | 8/2006 | Hajdukiewicz et al. |
| 7,121,013 B2 | | 10/2006 | Herkt et al. |
| 7,146,741 B2 | | 12/2006 | Butter et al. |
| 7,159,327 B2 | | 1/2007 | Baruchello et al. |
| 7,168,179 B2 | | 1/2007 | Baruchello et al. |
| 7,213,344 B2 | | 5/2007 | Jordil et al. |
| 7,213,345 B2 | | 5/2007 | Jordil et al. |
| 7,263,780 B2 | | 9/2007 | Jordil et al. |
| 7,464,483 B2 | | 12/2008 | Schopf et al. |
| 7,546,690 B2 | | 6/2009 | Groell et al. |
| 7,797,850 B2 | | 9/2010 | Hon et al. |
| 7,900,367 B2 | | 3/2011 | Sutherland |
| 2005/0204573 A1 | | 9/2005 | Kassai et al. |

FOREIGN PATENT DOCUMENTS

| | | |
|---|---|---|
| CN | 1782654 A | 6/2006 |
| CN | 101188051 A | 5/2008 |
| CN | 201607206 U | 10/2010 |
| DE | 141 197 A1 | 4/1980 |
| DE | 255 784 A1 | 4/1988 |
| DE | 37 40 657 A1 | 6/1989 |
| DE | 40 23 447 A1 | 1/1992 |
| DE | 93 20 426 U1 | 7/1994 |
| DE | 44 09 360 A1 | 9/1994 |
| DE | 43 18 741 A1 | 12/1994 |
| EP | 0 361 164 A1 | 4/1990 |
| EP | 0 390 648 A1 | 10/1990 |
| EP | 0 426 492 A2 | 5/1991 |
| EP | 0 628 785 A2 | 12/1994 |
| EP | 1 595 642 A1 | 11/2005 |
| FR | 2 617 588 A1 | 1/1989 |
| GB | 1 445 977 | 8/1976 |
| GB | 1 551 218 | 8/1979 |
| GB | 2 039 048 A | 7/1980 |
| GB | 2 238 126 A | 5/1991 |
| GB | 2 302 588 A | 1/1997 |
| JP | S54-112029 U | 6/1977 |
| JP | A-56-148008 | 11/1981 |
| JP | S59-168111 U | 11/1984 |
| JP | A-60-205209 | 10/1985 |
| JP | A-02-205451 | 8/1990 |
| JP | A-03-223602 | 10/1991 |
| JP | A-04-297803 | 10/1992 |
| JP | A-2000-304529 | 11/2000 |
| JP | 4291394 B1 | 7/2009 |
| JP | 2010-234463 A | 10/2010 |
| TW | I287090 B | 9/2007 |
| WO | WO 91/13315 A1 | 9/1991 |
| WO | WO 92/21932 A1 | 12/1992 |
| WO | WO 97/14023 A1 | 4/1997 |
| WO | WO 00/14474 A1 | 3/2000 |
| WO | WO 02/061378 A1 | 8/2002 |
| WO | WO 2004/023548 A1 | 3/2004 |
| WO | 2004/031684 A1 | 4/2004 |
| WO | WO 2005/065884 A2 | 7/2005 |
| WO | WO 2005/098355 A1 | 10/2005 |
| WO | WO 2006/120403 A1 | 11/2006 |

OTHER PUBLICATIONS

Apr. 20, 2011 European Search Report issued in European Patent Application No. 11 25 0060.

May 7, 2012 Search Report issued in International Application No. PCT/GB2012/000043.

May 7, 2012 Written Opinion issued in International Application No. PCT/GB2012/000043.

U.S. Appl. No. 13/979,740 in the name of McMurtry et al., filed Jul. 15, 2013.

Nov. 28, 2014 Office Action issued in European Application No. 12 703 140.9.

Apr. 1, 2015 Office Action issued in Chinese Application No. 201280005727.8.

Feb. 27, 2014 Office Action issued in Taiwanese Patent Application No. 101102284 (with translation).

*Product Information, Fluid 200 Fluid 50cs, 100cs, 200cs, 350cs, 500cs, 1000cs*, Dow Corning Corporation, Oct. 11, 2000.

Gore Membrane Vents Series HPM: High Protection against Mechanical Impact, W.L. Gore & Associates, 2004.

*Fidia K5*, Fidia S.p.A (with translation).

Apr. 20, 2011 European Search Report issued in European Patent Application No. 11250059.

Apr. 20, 2011 European Search Report issued in European Patent Application No. 11250060.

Feb. 12, 2014 Office Action and Search Report issued in Taiwanese Application No. 101102281 (with English translation).

Mar. 7, 2016 Office Action issued in Chinese Application No. 201280005851.4.

Feb. 10, 2016 Office Action issued in U.S Appl. No. 13/979,740.

Jan. 18, 2016 Office Action issued in Chinese Application No. 201280005727.8.

Sep. 1, 2015 Office Action issued in Japanese Application No. 2013-549873.

Sep. 1, 2015 Office Action issued in Japanese Application No. 2013-549874.

Jul. 16, 2015 Office Action issued in Chinese Application No. 201280005851.4.

* cited by examiner

ANALOGUE MEASUREMENT PROBE FOR A MACHINE TOOL APPARATUS AND METHOD OF OPERATION

The present invention relates to a measurement probe for use with coordinate positioning apparatus and a method of operation of such an analogue probe. In particular the invention relates to an analogue measurement probe for use with a machine tool apparatus and a method of operation of such an analogue probe.

Analogue measurement probes can comprise a stylus having a stylus tip for contacting the surface of a workpiece. The stylus may protrude from the probe body and be moveably connected to the probe body. The measurement probe can further comprise a sensor for measuring the movement of the stylus relative to the probe body. The stylus of the analogue measurement probe may be brought into contact with an object such that information about the shape or position of the object can be obtained. In analogue probes, the extent (and optionally direction) of deflection of the stylus can be sensed continuously as the stylus is moved along the surface of the workpiece and reported to an external device so that the deflection data can be combined with data representing the position of the probe to obtain a detailed measurement of the workpiece. See for example UK patent publication GB 1551218 and US patent publication US5390424 which describe examples of analogue probes. This is in contrast to touch-trigger probes which merely report when contact has occurred.

Analogue probes are typically used on coordinate measuring machines (CMMs) in order to provide coordinates of the surface of an object in space, for example to build up a three dimensional image of an object. CMMs generally only measure workpieces and do not perform any machining operations. Accordingly, analogue probes are typically used in clean environments which are safe from being exposed to contaminants which could interfere with the probe's sensors.

A probe on a machine tool apparatus is exposed to extreme environmental conditions including high and low temperatures and to frequent bombardment by contaminants such as swarf and coolant. They can also be subjected to high forces, especially during any automatic loading and unloading of the probe into the machine tool apparatus' spindle. For this reason, touch-trigger probes which are typically more rugged than analogue probes are normally used on machine tool apparatus. Even so, it can be important that a touch-trigger probe's sensor is sealed from such external contaminants so that they do not damage or interfere with the sensor and other inner workings of the probe. Failure to seal the probe can result in inaccurate measurements, or even cause the probe to not work at all.

Nevertheless, an analogue probe for use with a machine tool is also known, which is sealed so as to protect the internal sensor componentry from external contaminants. Furthermore, another analogue probe is known in which the internal sensor componentry is protected from local external contaminants during operation via protective membranes, but the internal sensor chamber is permanently open to the external atmosphere via a long breather tube which extends out of the back of the probe so as to fluidly connect the internal chamber of the analogue probe to a clean environment a distance away from the operating environment of the analogue probe.

This invention relates to an analogue probe for a machine tool apparatus in which the analogue probe's sensor is contained in a sealed chamber, thereby sealed from external contaminants during operation of the analogue probe on the machine tool apparatus, and in which a vent is provided between the sealed chamber and the analogue probe's operating environment, the vent being manipulable between an open and a closed state.

According to a first aspect of the invention there is provided an analogue probe for a machine tool apparatus, comprising: a probe body; a stylus member movably secured to the probe body; a sensor for measuring the extent of displacement of the stylus member relative to the probe body, in which the sensor is contained within a chamber in the probe body; and a vent between the chamber and the outside of the probe body, configured such that when the vent is open the pressure within the chamber can equalise with the analogue probe's operating environment pressure, and further configured such that the vent can be closed so as to seal the chamber and therefore the sensor from external contaminants during operation of the analogue probe.

It has been found that sealing an analogue measurement probe results in the pressure inside the probe body being set at the ambient pressure at the time of sealing. Any change in the pressure difference between the sealed chamber and the analogue probe's operating environment (e.g. its ambient atmosphere) can result in pressure forces being applied which result in movement of the stylus member relative to the probe body. Such changes in the pressure difference could arise due to changes in the analogue probe's operating environment (e.g. the ambient atmospheric temperature and/or air pressure). Furthermore, temperature changes in the measurement probe itself can also cause the pressure in the sealed chamber to change, thereby creating a change in the pressure difference between the sealed chamber and the analogue probe's operating environment. Such movement (which is induced by such changes in pressure) is hereinafter referred to as "pressure-induced movement". Such pressure-induced movement can be incorrectly read by the analogue probe as being movement caused by contact with an object, and hence such pressure-induced movement can cause false readings to be output by the analogue probe.

For example, if the ambient temperature decreases heat will be removed from the relatively hot probe and the temperature inside the probe will decrease. The decrease in pressure can suck the stylus member into the probe housing and cause the probe stylus to be moved towards the probe body in the probe's axial or z direction. As another example, if the ambient pressure decreases (and/or the temperature of the probe increases) the changes in pressure can result in the sealing member and hence the probe stylus being pushed out, or away from, the probe body in the probe's axial or z direction. Movement may alternatively or also occur in the x and/or y directions.

Furthermore, as will be understood, analogue measurement probes are generally configured such that the sensor can reliably measure the movement of the stylus member within a given reliable operating range. In extreme cases, the pressure-induced movement could be so great as to move the stylus member to outside of its given reliable operating range. Accordingly, even if the false readings caused by pressure-induced movement of the stylus member can be calibrated out, such pressure-induced movement can alter, for example reduce, the reliable operating range of the analogue probe.

In accordance with an analogue probe according to the invention, the sensor of the analogue probe according to the invention can be sealed from external contaminants, but the vent can be opened to allow equalisation of the pressure within the chamber with the analogue probes operating environment, so as to help avoid over or under pressurisation of the chamber which could interfere with the obtaining of accurate measurements with the analogue probe.

The vent's opening can be sealed by a plug. The plug could be configured such that it can be loosened whilst still attached to the analogue probe so as to allow the passage of gas between the chamber and the analogue probe's operating environment. Preferably, the plug is configured such that it can be completely removed from the analogue probe. The plug could comprise a friction-fit (e.g. a compression-fit) plug which can simply be pushed into and pulled out of the vent opening to seal and open the vent. Optionally, the plug could be fastened to the analogue probe so as to seal the chamber via any other suitable fastening mechanism, for instance via cooperating screw-threads or bayonet features.

The vent could be configured such that its opening can be opened via centrifugal force. For example, the vent's opening could be configured such that it opens on spinning the analogue probe above a predetermined rotational speed. For example, the vent's opening could be configured such that it opens on spinning the analogue probe at at least 500 rpm.

The vent could be configured to be opened manually. The analogue probe could comprise an actuator for opening the vent in response to a signal from a processor device. The processor device could be separate to the analogue probe and the analogue probe could comprise a receiver for receiving the signal from the processor device. Optionally, the analogue probe comprises the processor device. The processor device could comprise a device for detecting changes in pressure in the sealed chamber and/or in the analogue probe's operating environment. Such a device could be configured to measure pressure directly, e.g. such a device could be a pressure sensor. Optionally, such a device could measure pressure indirectly. For instance, the device could be a thermometer which could be used to derive changes in pressure, especially within the sealed chamber.

The plug can comprise a part of the analogue probe required, e.g. is essential, for operation of the analogue probe. For instance, the plug can comprise a workpiece contacting stylus.

Optionally, the vent's opening provides access to an area within the probe body for housing an electronic component. Accordingly, the plug can comprise a part for retaining the electronic component within the probe body. In particular, the area can be a battery chamber. The battery chamber can comprise at least one terminal for at least one battery for powering the analogue probe. Accordingly, the plug could comprise a part for retaining at least one battery within the analogue probe. The part could comprise at least one terminal for connecting to the battery.

Optionally, a port is provided between the sealed chamber and the vent's opening. The port can comprise a barrier for restricting solid contaminants entering the sealed chamber. The barrier could extend only partially across the entire area of the port. The barrier could extend across the entire area of the port. In this case the barrier could comprise a membrane for restricting the passage of solid and liquid contaminants, but allow the passage of gas through the port. In the embodiment in which the analogue probe comprises a battery housing comprising the vent opening, a transmission housing and a sensor housing, preferably the port is situated between the battery housing and the transmission housing.

Analogue probe components can be located in the vent between the sealed chamber and the vent's opening. For instance, electronic and/or mechanical components can be located in the vent. For instance, components for transmitting measurement signals to a receiver can be located in the vent. Furthermore, wires connecting the sensor to other electronic components in the analogue probe could be situated in the vent.

As will be understood, the vent's opening need not necessarily be at the periphery of the probe body. For instance, it could be at a location internal to the probe body, with at least one further conduit between the vent's opening and the outside of the probe body. This is especially the case for embodiments in which the vent can be opened under the control of an actuator and/or for instance when the vent can be opened via centrifugal force.

According to a second aspect of the invention there is provided a method of operating an analogue probe for a machine tool apparatus which comprises a probe body, a stylus member movably secured to the probe body, a sensor for measuring the extent of displacement of the stylus member relative to the probe body, in which the sensor is contained within a chamber in the probe body, and a vent between the chamber and the outside of the probe body, in which the method comprises opening the vent so as to equalise the pressure within the chamber with the analogue probe's operating environment pressure, and closing the vent so as to seal the chamber and therefore the sensor from external contaminants.

As mentioned above, the vent's opening can be sealed by a plug. The plug could be configured such that it can be loosened whilst still attached to the analogue probe so as to allow the passage of gas between the chamber and the analogue probe's operating environment. Accordingly, the method can comprise at least loosening the plug. Preferably, the plug is configured such that it can be completely removed from the analogue probe. Accordingly, the method can comprise removing the plug from the analogue probe.

The plug can comprise a part of the analogue probe that is required, e.g. that is essential, for operation of the analogue probe. Accordingly, the method can comprise at least loosening, and optionally removing, a part of the analogue probe that is required, e.g. that is essential, for operation of the analogue probe. For instance, the plug can comprise a workpiece contacting stylus. Accordingly, the method can comprise at least loosening, and optionally removing, a workpiece contacting stylus.

Optionally, the vent's opening provides access to an area within the probe body for housing an electronic component. Accordingly, the plug can comprise a part for retaining the electronic component within the probe body. Accordingly, opening the vent can comprise at least partially removing an electronic component from within the analogue probe. In particular, the area can be a battery chamber. The battery chamber can comprise at least one terminal for at least one battery for powering the analogue probe. Accordingly, the plug could comprise a part for retaining at least one battery within the analogue probe. The part could comprise at least one terminal for connecting to the at least one battery. Accordingly, opening the vent can comprise at least partially removing at least one battery from within the analogue probe.

The vent could be configured such that its opening can be opened via centrifugal force. For example, the vent's opening could be configured such that it opens on spinning the analogue probe above a predetermined rotational speed. For example, the vent's opening could be configured such that it opens on spinning the analogue probe at at least 500 rpm. Accordingly, the method can comprise spinning the analogue probe so as to open the vent. In particular, the method can comprise spinning the analogue probe at at least 500 rpm so as to open the vent.

The vent could be configured to be opened manually. Accordingly, the method can comprise manually opening the vent. The analogue probe could comprise an actuator for opening the vent in response to a signal from a processor device. Accordingly, the method can comprise a processor device controlling an actuator so as to open the vent. The processor device could be separate to the analogue probe and the analogue probe could comprise a receiver for receiving the signal from the processor device. Optionally, the analogue probe comprises the processor device. The method could comprise processor device detecting changes in pressure in the sealed chamber and/or in the analogue probe's operating environment and opening the vent in response thereto. Such a device could be configured to measure pressure directly, e.g. such a device could be a pressure sensor. Optionally, such a device could measure pressure indirectly. For instance, the device could be a thermometer which could be used to derive changes in pressure, especially within the sealed chamber.

Accordingly, this application describes a sealed analogue probe, in particular a sealed analogue contact probe. In particular, the application describes an analogue probe for a machine tool apparatus, in which the analogue probe's sensor is contained in a sealed chamber, thereby sealed from external contaminants during operation of the analogue probe on the machine tool apparatus. In a further embodiment, there is described an analogue probe for a machine tool apparatus comprising a probe body, a stylus member and a sensor for measuring displacement of the stylus member relative to the housing, in which at least a first compliant sealing member is provided which extends between the probe body and relatively moveable stylus member, such that the sensor is contained within a sealed chamber and thereby sealed from external contaminants.

Accordingly, this application also describes an analogue probe for a machine tool apparatus, comprising: a probe body; a stylus member movably secured to the probe body in a suspended rest position via a suspension mechanism; a sensor for measuring the extent of displacement of the stylus member relative to the probe body from a rest position; a first compliant sealing member extending between the probe body and stylus member such that the sensor is contained within a chamber sealed from external contaminants; and means for suppressing movement of the stylus member away from its suspended rest position induced by changes in the chamber's internal pressure and/or changes in the analogue probe's operating environment.

As mentioned above, sealing an analogue measurement probe results in the pressure inside the probe body being set at the ambient pressure at the time of sealing and pressure differences between the sealed chamber and the analogue probe's operating environment (e.g. its ambient atmosphere) can result in pressure forces being applied, in particular to the first compliant sealing member, which result in movement of the stylus member relative to the probe body.

Such above described pressure-induced movement can be at least reduced by an analogue probe having such means for suppressing movement. Furthermore, it has been found that providing such a configuration can decrease the complexity of the probe calibration required compared to sealed analogue probes which do not suppress such movement of the stylus member.

As will be understood, the analogue probe could be configured such that some pressure-induced movement is possible, albeit significantly reduced compared to current sealed analogue probes having no suppressing means. For example, the means for suppressing movement could be configured such that a change in the analogue probe's operating atmospheric pressure of up to 90 mbar will not cause movement of the stylus member through more than 75% of its total possible extent of movement in at least one degree of freedom, more preferably not cause movement of the stylus member through more than 50%, especially not cause movement of the stylus member preferably through more than 25%, for example not cause movement of the stylus member through more than 5% of its total possible extent of movement in at least one degree of freedom. The at least one degree of freedom could, for instance, be a direction parallel to the length of the stylus member.

For example, the means for suppressing movement can be configured such that a change in the analogue probe's operating atmospheric pressure of up to +/−90 mbar will not cause the stylus member to move from its suspended rest position (e.g. from its original rest position set at the time of sealing) by more than 50 µm in at least one degree of freedom, preferably will not cause the stylus member to move from its suspended rest position by more than 25 µm in at least one degree of freedom due to pressure induced changes, more preferably will not cause the stylus member to move from its suspended rest position by more than 10 µm in at least one degree of freedom due to pressure induced changes, especially preferably will not cause the stylus member to move from its suspended rest position by more than 1 µm in at least one degree of freedom due to pressure induced changes. In particular, the means for suppressing movement can be configured such that a change in the analogue probe's operating atmospheric pressure of up to 90 mbar will not cause the stylus member to move from its suspended rest position through more than 10% of its working linear measuring range in at least one degree of freedom, preferably will not cause the stylus member to move from its suspended rest position through more than 7% of its working linear measuring range in at least one degree of freedom, more preferably will not cause the stylus member to move from its suspended rest position through more than 5% of its working linear measuring range in at least one degree of freedom, especially preferably will not cause the stylus member to move from its suspended rest position through more than 1% of its working linear measuring range in at least one degree of freedom. Preferably, any such pressure-induced movement is substantially minimised, and in particular is reduced substantially to zero.

Accordingly, the means for suppressing movement can be configured to substantially prevent any movement of the stylus member away from its suspended rest position induced by changes in the chamber's internal pressure and/or analogue probe's operating environment.

The means for suppressing movement can be configured such that the stylus member's suspended rest position remains substantially constant for a range of changes in the analogue probe's operating atmospheric pressure. For example, the analogue probe can be adaptive to changes in the pressure in its operating environment such that the stylus member's suspended rest position remains substantially constant throughout changes in pressure of +/−90 mbar.

The above examples describe movement of the stylus member away from its rest position due to changes in pressure. As will be understood, the change in pressure can be measured from any given pressure at any given point in time. Optionally, the change in pressure can be measured as the deviation from the sealing pressure—i.e. the chamber's internal pressure and/or analogue probe's operating environment pressure at the time of sealing. Accordingly, the rest position can be the position of the stylus member at the time of sealing.

The probe body can comprise a machine mount for engagement with a probe mount on a measuring machine, for instance with a spindle on a machine tool. As will be understood, the analogue probe can comprise a stylus extending from the probe body which can move relative to the probe body on contact with a workpiece. The probe body can comprise at least one sensor for determining the extent of such movement. As will be understood, the stylus member can comprise a workpiece contacting stylus. Optionally, the stylus member can comprise a stylus holder for a stylus. Accordingly, a stylus can be releasably attached to the stylus holder. Optionally, the stylus member can be directly connected to a stylus in use, such that movement of the stylus causes movement of the stylus member which can be detected by the sensor to determine the extent of deflection of the stylus.

The first compliant sealing member can be exposed to the probe body's internal chamber on a first side and exposed to the analogue probe's environmental atmosphere on a second side. The first compliant sealing member can be referred to as a front seal. The second side of the first compliant sealing member could be directly exposed to the analogue probe's operating environment. Optionally, the second side of the first compliant sealing member could be indirectly exposed to the analogue probe's operating environment. For instance, the second side of the first compliant sealing member could be directly exposed to a breather chamber which is fluidly connected to the analogue probe's operating environment. A gas-permeable membrane could be provided between the breather chamber and the analogue probe's operating environment so as to restrict the ingress of liquids and solids into the breather chamber. The membrane may be, for example, an oleophobic membrane. Alternatively or additionally the membrane may be hydrophobic. The membrane may be, for example, expanded Poly-tetrafluroethylene.

The means for suppressing movement could comprise a liquid. The means could comprise a liquid which substantially fills the internal chamber. Preferably the liquid substantially fills the probe body's sealed chamber. Preferably the liquid is electrically insulating. Suitable liquids include silicon fluids, including silicon oils, for example Polydimethlysiloxane. Accordingly, the sealed chamber could comprise a self-contained reservoir filled with substantially incompressible liquid. Accordingly, the sealed chamber, i.e. reservoir, can be of a fixed volume.

Optionally, the means for suppressing movement could be configured to adapt the analogue probe in response to changes in the chamber's internal pressure and/or changes in the analogue probe's operating atmosphere so as to suppress movement of the stylus member away from it suspended rest position. Accordingly, in line with the below described embodiments, the means could be configured to regulate the position of the stylus member in response to such changes in chamber's internal pressure and/or changes in the analogue probe's operating environment.

The means for suppressing movement could monitor for changes in pressure in the chamber's internal pressure and/or analogue probe's operating environment. The means for suppressing movement can monitor for such changes and respond accordingly. The means for suppressing movement could actively monitor for such changes. For example, the means for suppressing movement could comprise a pressure sensor for sensing the internal chamber's and/or analogue probe's operating environment pressure and operate a device accordingly. Optionally, the means for suppressing movement could measure pressure indirectly. For instance, the means for suppressing movement could measure temperature which can be used to derive changes in pressure, especially within the sealed chamber.

Optionally, the means for suppressing movement passively monitors changes in pressure. For example, as described in more detail below, the means for suppressing movement could comprise a member which is affected by changes in the internal chamber's and/or analogue probe's environmental pressure in a way which at least partially opposes the effect such pressure changes have on the first compliant member.

The means for suppressing movement could be configured to regulate the pressure within the sealed chamber. For example, the means for suppressing movement could be configured to transfer fluid between the sealed chamber and a reserve chamber in the analogue probe so as to regulate the pressure within the sealed chamber. Accordingly, the means for suppressing movement could comprise a pump for pumping fluid between the sealed chamber and the reserve chamber, for example a reserve bladder or balloon. Optionally, the means for suppressing movement could be configured to alter the volume of the sealed chamber. For example, the means could comprise a piston, the position of which can be altered, for example via a motor, so as to alter the volume of sealed chamber via expansion or contraction. Optionally, at least a part of the probe could be telescopic so as to allow the alteration of the volume of the sealed chamber. For instance, a syringe mechanism could be provided fluidly connected to the sealed chamber which can be extended or contracted so as to alter the volume of the sealed chamber. The means for suppressing movement could be configured to adapt the pressure in the area sealed by the at least first sealing member such that the resultant pressure difference across the two sides of at least first compliant sealing member is substantially zero. In such an embodiment the means for suppressing movement could be configured to adapt the pressure in the area to which the inside of the at least first sealing member is exposed to be substantially identical to the analogue probe's environmental pressure.

Optionally, the means for suppressing movement could be configured to act on, e.g. provide a force on, the stylus member. For example, the means could be configured to apply and regulate an opposition force (e.g. on the stylus member) so as to oppose forces acting on the stylus member caused by changes in the chamber's internal pressure and/or changes in the analogue probe's operating atmosphere. The means for suppressing movement could be configured to provide a substantially equal and opposite force to that exerted on the stylus member by the first compliant sealing member. Accordingly, the means for suppressing movement can be configured to substantially counterbalance any pressure-induced forces on the at least one compliant sealing member. The means for suppressing movement could act directly on the stylus member. Optionally, the means for suppressing movement could act indirectly on the stylus member, e.g. via an intermediate member.

The means for suppressing movement could act on the stylus member at the same point as at least a part of the suspension mechanism. Accordingly, the means for suppressing movement could comprise a means for regulating the suspension mechanism. For instance, the means could regulate the position of at least a part of the suspension mechanism or the retaining force applied by at least a part of the suspension mechanism onto the stylus member.

Optionally, the means for suppressing movement could be independent of the suspension mechanism. For instance, it could be configured to act on the stylus member at a point separate to that of the suspension mechanism.

The means for suppressing movement could comprise a second compliant sealing member, for sealing the sensor within the probe body from external contaminants. The second compliant sealing member could be configured such that the volume of the sealed chamber can vary in response to changes in the analogue probe's environmental pressure. The second compliant sealing member can be exposed to the probe body's sealed chamber on a first side and exposed to the analogue probe's operating environment on a second side. The second side of the second compliant sealing member could be directly exposed to the analogue probe's operating environment. Optionally, the second side of the second compliant sealing member could be indirectly exposed to the analogue probe's operating environment. For instance, the second side of the second compliant sealing member could be directly exposed to a breather chamber which is fluidly connected to the analogue probe's operating environment. A gas-permeable membrane could be provided between the breather chamber and the analogue probe's operating environment so as to restrict the ingress of liquids and solids into the breather chamber. The membrane may be, for example, an oleophobic membrane. Alternatively or additionally the membrane may be hydrophobic. The membrane may be, for example, expanded Poly-tetrafluroethylene.

The second compliant sealing member can referred to as a back seal. The second compliant sealing member can extend between the housing and stylus member. In particular, the second compliant sealing member can extend between the housing and stylus member at a point distal to the at least one first sealing member. Preferably, the second compliant sealing member is configured to provide a substantially equal and opposite force to the first sealing member on the stylus member. The first and second compliant sealing members could have substantially equal effective surface areas. As will be understood, the effective surface area is the area exposed to the probe body's internal or external atmosphere. Accordingly, this may be the area on which a pressure force, due to a difference between the internal probe pressure and the analogue probe's environmental pressure, may act. The provision of substantially equal and opposite forces could be achieved by the first and second compliant sealing members being substantially identical. In particular, the first and second compliant sealing members can be substantially identical in shape. The first and second compliant sealing members can be substantially identical in size. In particular, the first and second compliant sealing members can arranged so as to be substantially mirror images of each other. The first and second compliant sealing members can be made from materials having substantially identical properties, in particular deformation properties. In particular, the first and second compliant sealing members can be made from substantially identical materials.

The first (and any further) compliant sealing member could be compliant in that it is deformable. Optionally, the first compliant sealing member could be compliant in that it is moveable relative to the probe body. For example, the first compliant sealing member could comprise a piston. The first compliant sealing member could be resilient, i.e. it could provide at least some resistance to being displaced or deformed.

The first sealing member and compensator (e.g. second compliant sealing member) could be configured to act on the stylus member at substantially equal distances from the stylus member's pivot point when the stylus member is at its rest position. However, other considerations such as the length of the probe may be taken into account when positioning the first sealing member and compensator (e.g. second compliant sealing member) such that the first sealing member and compensator (e.g. second compliant sealing member) may be spaced unequal distances from the stylus member's pivot point.

The first (and any further) compliant sealing member can be substantially annular. Accordingly, the first (and any further) compliant sealing member can radially extend around a point on the stylus member. Accordingly, the first (and any further) compliant sealing member could be referred to as a sealing diaphragm. The first (and any further) compliant sealing member could be substantially planar. Optionally, the first (and any further) compliant sealing member could be substantially non-planar. In particular, the first (and any further) compliant sealing member could comprise a contorted cross-sectional profile. For example, the first (and any further) compliant sealing member could have a curved cross-sectional profile. It has been found preferable to provide the first (and any further) compliant sealing member with an undulated cross-sectional profile. The first (and any further) compliant sealing member can comprise a stepped cross-sectional profile. Accordingly, the undulated cross-sectional profile could comprise at least one flat-bottomed U-shaped bend. The undulated cross-sectional profile could comprise at least two flat-bottomed U-shaped bends. The two flat-bottomed U-shaped bends could share at least one common side. Preferably, the open ends of the U-shaped bends face in substantially opposite directions. In this case, the cross-sectional profile of the first (and any further) compliant sealing member, between its outer and inner edges, can comprise an approximate S-shape (having substantially straight edges).

At least one of the first and second compliant sealing members may comprise a flexible material. Preferably, the material of at least one of the first and second compliant sealing members is able to retain its mechanical properties at a range of temperatures, for example between 0° and 70°, in particular for example between 5° and 55°. More preferably, the material is resistant to degradation by such chemical solvents and coolants as are used in machine tool type environments. Additionally, the material is preferably substantially non-permeable. At least one of the first and second diaphragms may comprise a rubber material. In particular, at least one of the first and second diaphragms may comprise, for example, a fluorocarbon rubber or a silicone rubber.

The probe body could comprise a sensor housing. The sensor housing may be connectable, directly or indirectly, to other probe modules. The analogue probe could comprise a transmission housing to which the sensor housing may be connected, directly or indirectly. Said transmission housing may contain a transmission system for sending data obtained by the sensor to a receiver. The transmission system may be, for example, a wireless transmission system, for instance an optical, radio, or inductive transmission. In the case of an optical transmission, for example, the receiver may be an optical receiver module located on the machine tool apparatus on which the analogue probe is mounted. The transmission housing could be a transceiver housing, comprising a transceiver system for sending and receiving data to and from at least one receiver and transmitter (e.g. an external transceiver).

Where cable connections are required between the sensor inside the sensor housing and another probe module housing (such as the transmission housing), sealed cable channels may be provided between the two housings such that the sealed chamber remains sealed from the ambient atmosphere.

The analogue probe may further comprise a power-source housing, for example a battery housing, to which the sensor housing may be connectable, directly or indirectly. The sensor housing can be connectable to the transmission housing which is in turn connectable to the battery housing. A machine mount (described in more detail above) could be provided on the power-source housing.

A vent can be provided between the sealed chamber and the outside of the probe body configured such that when the vent is open the pressure within the chamber can equalise with the analogue probe's operating environment pressure, and further configured such that the vent's opening can be closed so as to seal the sensor from external contaminants during operation of the analogue probe. The vent's opening can be sealed by a plug. The plug could be configured such that it can be loosened whilst still attached to the analogue probe so as to allow the passage of gas between the chamber and the analogue probe's operating environment. Preferably, the plug is configured such that it can be completely removed from the analogue probe. The plug could comprise a friction-fit (e.g. a compression-fit) plug which can simply be pushed into and pulled out of the vent opening to seal and open the vent. Optionally, the plug could be fastened to the analogue probe so as to seal the chamber via any other suitable fastening mechanism, for instance via cooperating screw-threads or bayonet features.

The vent could be configured such that its opening can be opened via centrifugal force. For example, the vent's opening could be configured such that it opens on spinning the analogue probe above a predetermined rotational speed. For example, the vent's opening could be configured such that it opens on spinning the analogue probe at at least 500 rpm.

The vent could be configured to be opened manually. The analogue probe could comprise an actuator for opening the vent in response to a signal from a processor device. The processor device could be separate to the analogue probe and the analogue probe could comprise a receiver for receiving the signal from the processor device. Optionally, the analogue probe comprises the processor device. The processor device could comprise a device for detecting changes in pressure in the sealed chamber and/or in the analogue probe's operating environment. Such a device could be configured to measure pressure directly, e.g. such a device could be a pressure sensor. Optionally, such a device could measure pressure indirectly. For instance, the device could be a thermometer which could be used to derive changes in pressure, especially within the sealed chamber.

The plug can comprise a part of the analogue probe required, for example is essential, for operation of the analogue probe. For instance, the plug can comprise a workpiece contacting stylus.

Optionally, the vent's opening provides access to an area within the probe body for housing an electronic component. Accordingly, the plug can comprise a part for retaining the electronic component within the probe body. In particular, the area can be a battery chamber. The battery chamber can comprise at least one terminal for a battery for powering the analogue probe. Accordingly, the plug could comprise a part for retaining the battery within the analogue probe. The part could comprise at least one terminal for connecting to the battery.

Optionally, a port is provided between the sealed chamber and the vent's opening. The port can comprise a barrier for restricting solid contaminants entering the sealed chamber. The barrier could extend only partially across the entire area of the port. The barrier could extend across the entire area of the port. In this case the barrier could comprise a membrane for restricting the passage of solid and liquid contaminants, but allow the passage of gas through the port. In the embodiment in which the analogue probe comprises a battery housing comprising the vent opening, a transmission housing and a sensor housing, preferably the port is situated between the battery housing and the transmission housing.

Analogue probe components can be located in the vent between the sealed chamber and the vent's opening. For instance, electronic and/or mechanical components can be located in the vent. For instance, components for transmitting measurement signals to a receiver can be located in the vent. Furthermore, wires connecting the sensor to other electronic components in the analogue probe could be situated in the vent.

The suspension mechanism could be configured to facilitate at least one translational degree of freedom of the stylus member relative to the probe body, for example, in at least both directions from the suspended rest position along at least one linear dimension. This could be for example into and out of the probe body (e.g. along the longitudinal length of the probe/stylus). The suspension mechanism could be configured to facilitate, for example, two or three translational degrees of freedom. The suspension mechanism could be configured to facilitate at least one rotational degree of freedom of the stylus member relative to the housing. The suspension mechanism could be configured to facilitate, for example, two or three rotational degrees of freedom. Preferably the suspension mechanism is configured to facilitate one translational degree of freedom and two rotational degrees of freedom of the stylus member relative to the housing. The stylus member could be held in a floating rest position via the suspension mechanism, in that it can move in opposite directions in the degrees of freedom that it can move in. In other words, the stylus member could be in a floating rest position in that when in its rest position it is not (at least in its permitted degrees of freedom) biased against a stop, i.e. its rest position is not fixed.

The suspension mechanism could comprise at least one resiliently compliant member. Preferably the suspension mechanism comprises two resiliently compliant members. The resiliently compliant members could be for example resiliently deformable members. The at least one resilient compliant member may comprise, for example, at least one spring, rubber block, slideway or parallel action mechanism.

The sensor may comprise first and second parts. The first sensor part may be secured to the stylus member, and moveable with the stylus member. The second sensor part may be secured to the probe body. Thus, when the stylus member is deflected, the stylus member and thus the first sensor part are moved relative to the probe body and thus the second sensor part, such movement being measurable by at least one of the first and second sensor parts. The sensor could be a capacitive sensor. Accordingly, the first sensor part could be a first capacitive sensor part and the second sensor part could be a second capacitive sensor part. In this case any such movement can cause a measurable change in capacitance. The first and second capacitive sensor parts could be substantially annular in shape. The at least two tube annular parts may be coaxial and radially spaced apart by a dielectric air gap. Any change in capacitance may be used to determine the magnitude and/or direction of the movement of the stylus member from its suspended rest position. The annular part may be completely annular, or may, for example be formed from substantially discrete annular portions. The annular portion may be, for example, cylindrical, square, hexagonal or irregularly shaped tube members. Alternatively the capacitance sensor may be, for example, in the form of flat plates.

Optionally, the sensor comprises, for example, an optical sensor. Other types of sensors which may be used include, for example, an inductive sensor, a resistive sensor, a piezo sensor or an ultrasonic sensor.

As will be understood, the analogue measurement probe may also be suitable for use with types of coordinate positioning apparatus other than machine tool apparatus such as, for example, a coordinate measuring machine (CMM).

As will be understood, any and optionally all of the means for suppressing movement described above and below could be a suppressor that is configured to suppress movement of the stylus member away from its suspended rest position. Optionally, the means for suppressing movement could be a compensation member. The compensation member could be provided to counteract, e.g. substantially counterbalance, a first force acting on the stylus member due to pressure induced forces on the first compliant sealing member.

Accordingly, this application describes, an analogue probe for a machine tool apparatus, comprising: a probe body; a stylus member movably secured to the probe body in a suspended rest position via a suspension mechanism; a sensor for measuring the extent of displacement of the stylus member relative to the probe body from a rest position; a first compliant sealing member extending between the probe body and stylus member such that the sensor is contained within a chamber sealed from external contaminants; and a suppressor which suppresses movement of the stylus member away from its suspended rest position induced by changes in the chamber's internal pressure and/or changes in the analogue probe's operating environment.

Furthermore, this application describes, a method of operating an analogue probe for a machine tool apparatus which comprises a probe body, a stylus member movably secured to the probe body in a suspended rest position via a suspension mechanism, a sensor for measuring the extent of displacement of the stylus member relative to the probe body from a rest position, a first compliant sealing member extending between the probe body and stylus member such that the sensor is contained within a chamber sealed from external contaminants and a suppressor, in which the method comprises the suppressor suppressing movement of the stylus member away from its suspended rest position induced by changes in the chamber's internal pressure and/or changes in the analogue probe's operating environment. In line with the above, the suppressor can be a liquid contained in the chamber. The suppressor can be a regulator for regulating the position of the stylus member. For instance, the regulator can regulate the pressure within the chamber. The regulator can regulate a force applied to the stylus member to oppose any pressure-induced forces on the stylus member via the first compliant sealing member. For instance, the suppressor could comprise a second compliant sealing member, for sealing the sensor within the probe body from external contaminants.

Accordingly, in line with the above, this application also describes a positioning apparatus comprising an analogue probe mounted thereon, the analogue probe comprising: a probe body; a stylus member movably secured to the probe body in a suspended rest position; a sensor for measuring the extent of displacement of the stylus member relative to the probe body from its suspended rest position; a first compliant sealing member extending between the probe body and stylus member such that the sensor is contained within a chamber sealed from external contaminants; and means for suppressing movement of the stylus member away from its suspended rest position induced by changes in the chamber's internal pressure and/or changes in the analogue probe's operating environment.

The positioning apparatus may comprise, a coordinate position apparatus, for example, a machine tool apparatus, a lathe or a grinder.

There is further described in this application a measurement probe for a machine tool comprising: a housing; a stylus member, said stylus member being moveable relative to the housing from a first position to a second position; a sensor for sensing movement of the stylus member relative to the housing, said sensor being substantially contained within the housing; characterised in that a moveable first sealing member is provided for sealing between the housing and the stylus member, such that the sensor is sealed within the housing, and that a compensation member is provided to counteract, e.g. substantially counterbalance, a first force acting on the stylus member due to pressure induced forces on the first sealing member. Accordingly, any movement of the stylus member away from its first position due to the first force is substantially prevented.

Accordingly, in line with the above, according to another aspect of the invention there is provided an analogue probe for a machine tool apparatus, comprising: a probe body; a stylus member movably secured to the probe body in a suspended rest position via a suspension mechanism; a sensor for measuring the extent of displacement of the stylus member relative to the probe body from a rest position; a first compliant sealing member extending between the probe body and stylus member such that the sensor is contained within a chamber sealed from external contaminants; and a compensation member is provided to counteract, e.g. substantially counterbalance, a first force acting on the stylus member due to pressure induced forces on the first compliant sealing member. Accordingly, the means for suppressing/ the suppressor can comprise/be a compensation member. Accordingly, in line with the above the compensation member can be configured to substantially prevent any movement of the stylus member away from its suspended rest position induced by changes in the chamber's internal pressure and/or analogue probe's operating environment. The compensation member can be configured such that the stylus member's suspended rest position remains substantially constant for a range of changes in the analogue probe's operating atmospheric pressure. The compensation member could be configured to regulate the position of the stylus member in response to such changes in chamber's internal pressure and/or changes in the analogue probe's operating environment. The compensation member could be configured to act on, e.g. provide a force on, the stylus member. The compensation member could be configured to provide a substantially equal and opposite force to that exerted on the stylus member by the first compliant sealing member. Accordingly, the compensation member can be configured to substantially counterbalance any pressure-induced forces on the at least one compliant sealing member. The compensation member could act directly on the stylus member. The compensation member could comprise a second compliant sealing member, for sealing the sensor within the probe body from external contaminants.

Accordingly, in line with the above, according to a further aspect of the invention there is provided an analogue probe for a machine tool apparatus, comprising: a probe body; a stylus member movably secured to the probe body in a suspended rest position via a suspension mechanism; a sensor for measuring the extent of displacement of the stylus member relative to the probe body from a rest position; a first compliant sealing member extending between the probe body and stylus member such that the sensor is contained within a chamber sealed from external contaminants; and a second compliant sealing member extending between the housing and stylus holder at a point distal to the at least one first sealing member, for sealing the sensor from external contaminants.

This application yet further describes a deformable seal for sealing an annular space between a stylus member and an outer wall of a probe body, the seal having an undulated cross-sectional profile, comprising at least one flat-bottomed U-shaped bend. It has been found that the provision of at least one flat-bottomed U-shaped bend as opposed to a rounded U-shaped bend provided greater flexibility of the deformable seal and hence less resistance to relative movement of the parts that it extends between. The undulated cross-sectional profile can comprise at least two flat-bottomed U-shaped bends. The two flat-bottomed U-shaped bends can share at least one common side. In this case, the cross-sectional profile of the deformable seal, between an outer and an inner edge can comprise an approximate S-shape (having substantially straight edges).

An embodiment of the invention will now be described, by way of example only, with reference to the drawings, in which.

Figure 2:
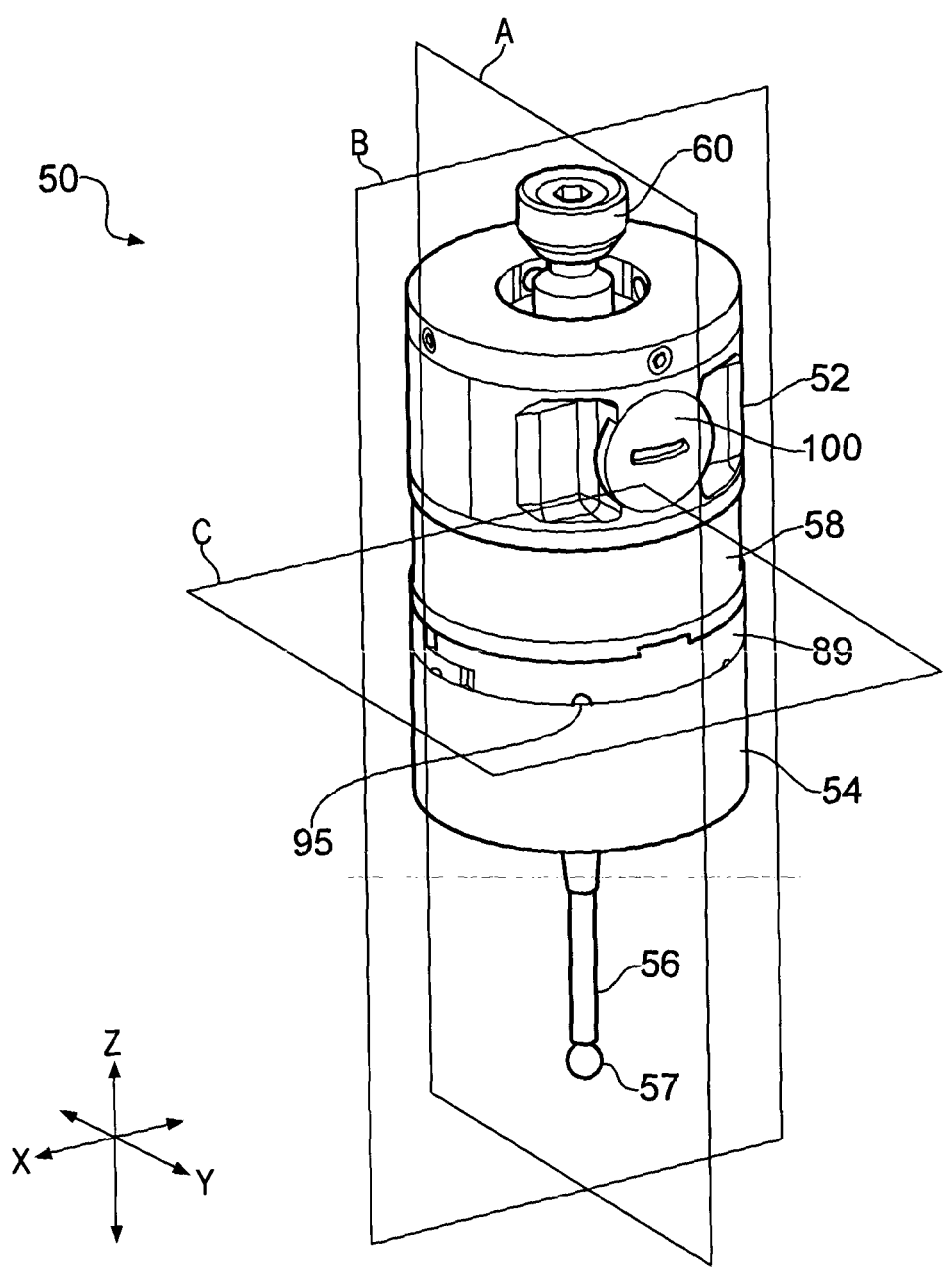
FIG. 2 shows an isometric view of an analogue probe according to the present invention.
Figure 10:
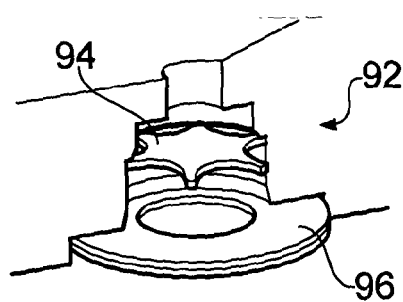
Figure 8:
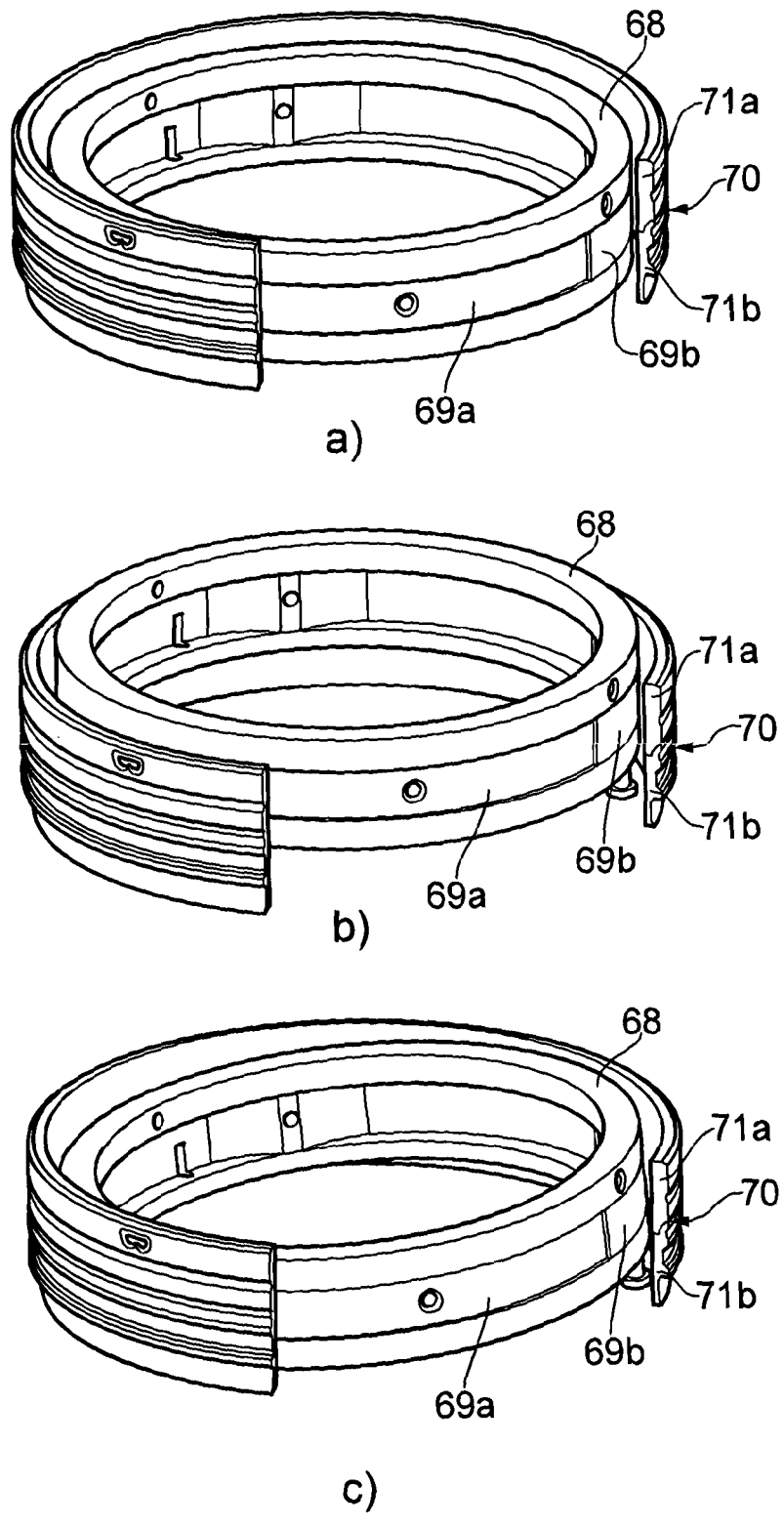
Figure 9A:
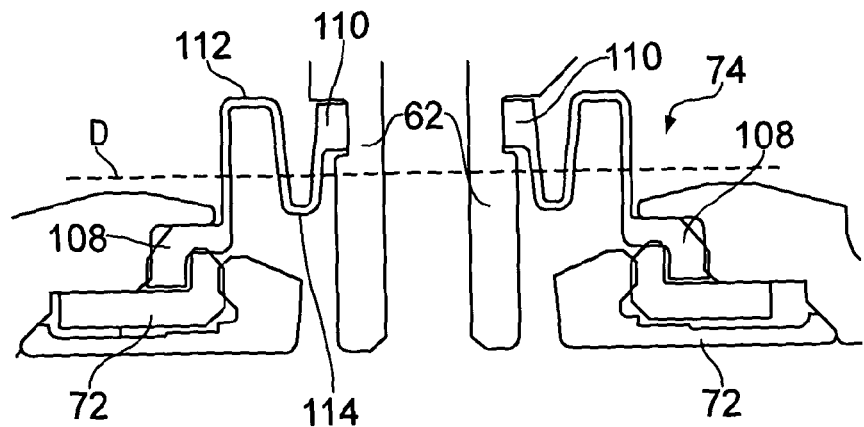
Figure 9B:
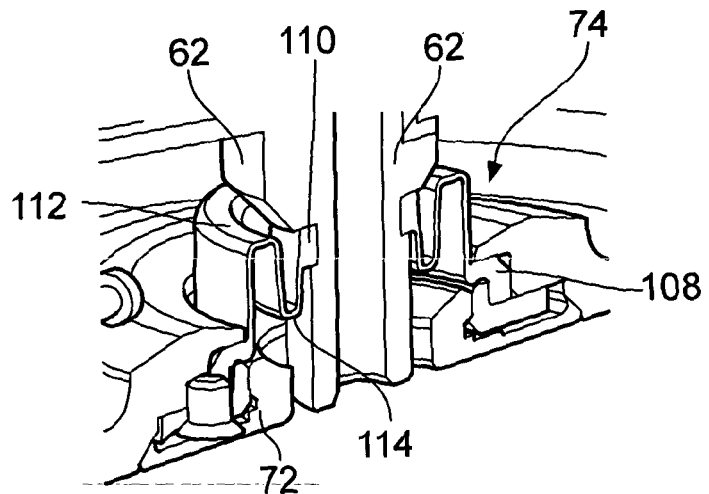
Figure 9C:
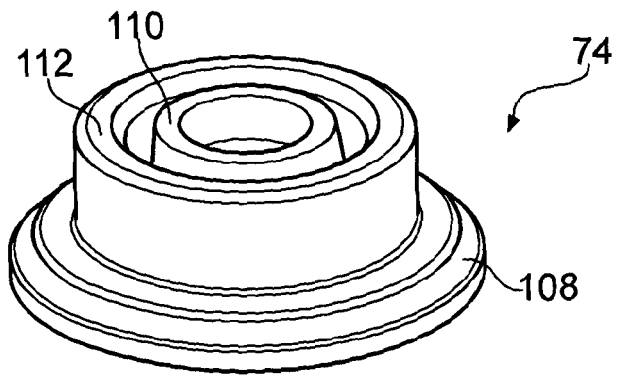
Figure 11:
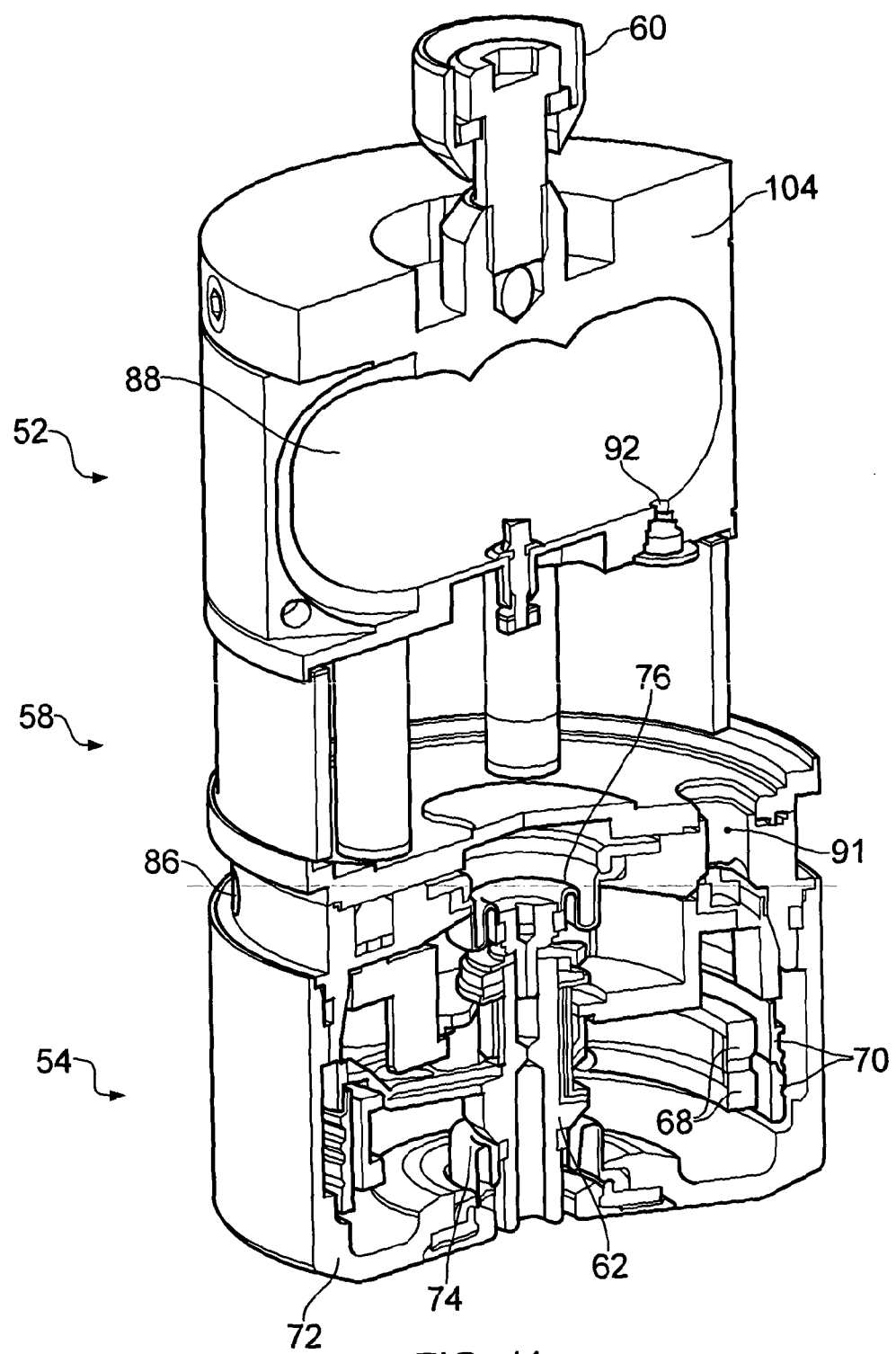
Figures 12, 13:
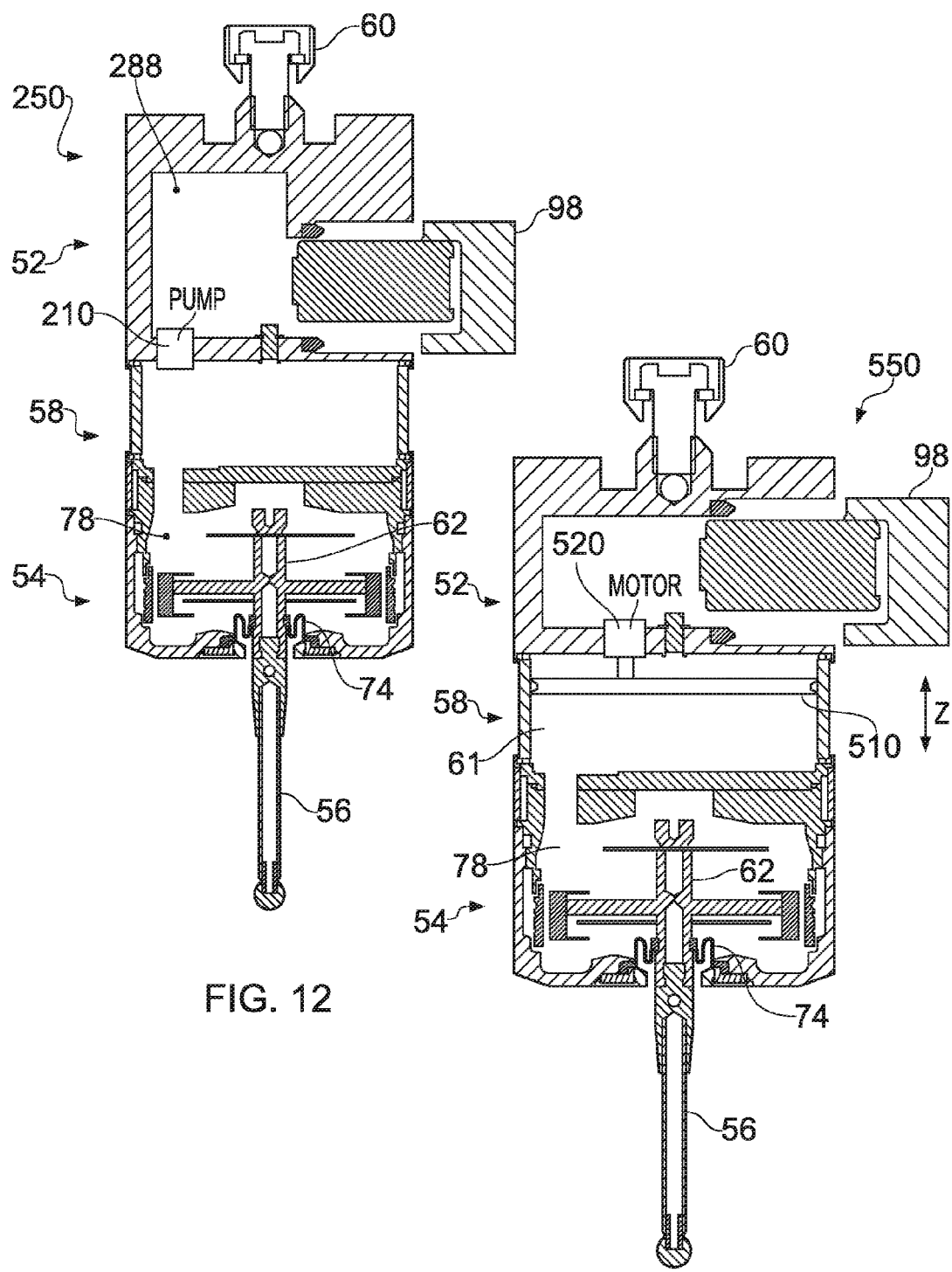
Figure 14:
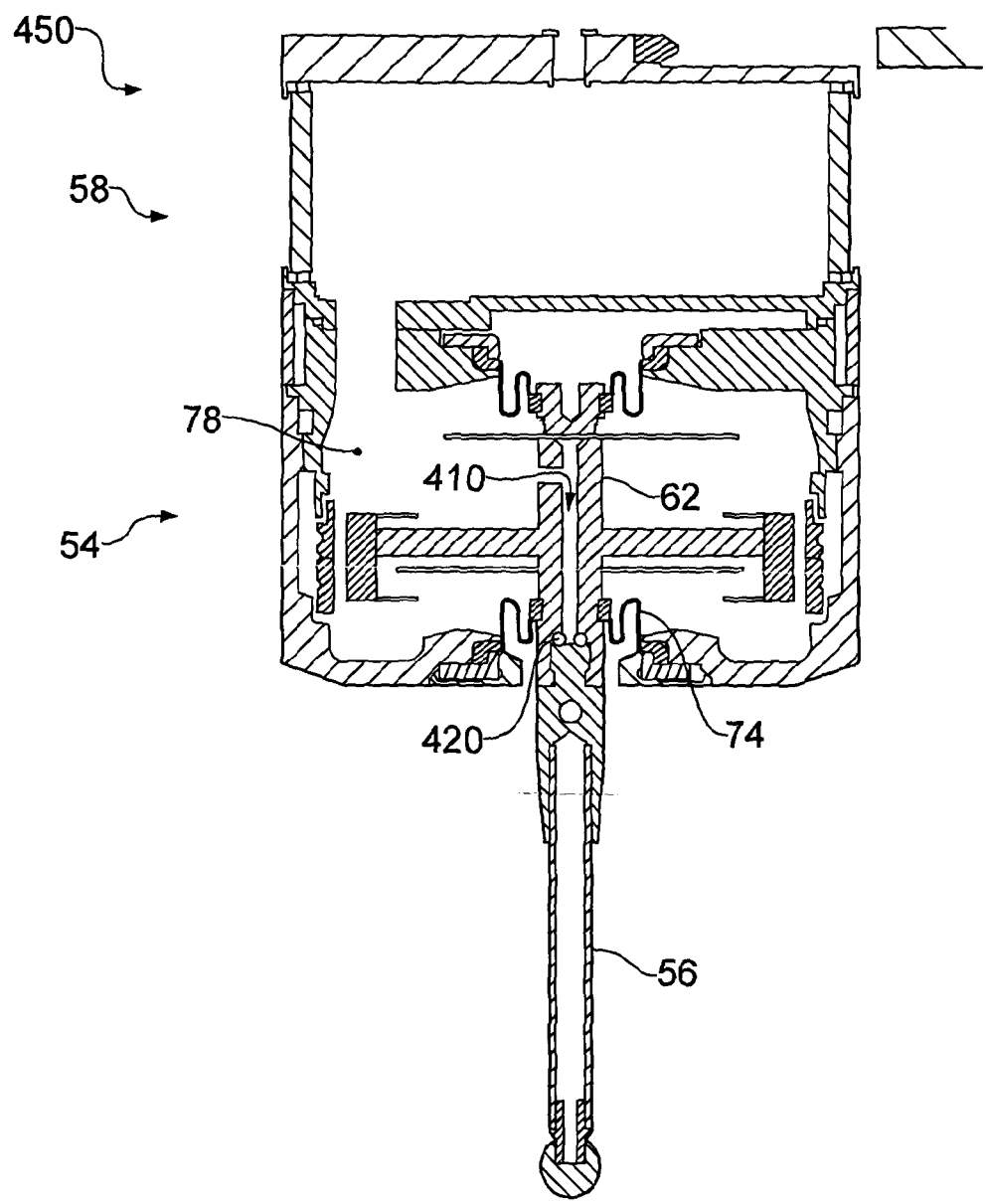
Figures 15, 16:
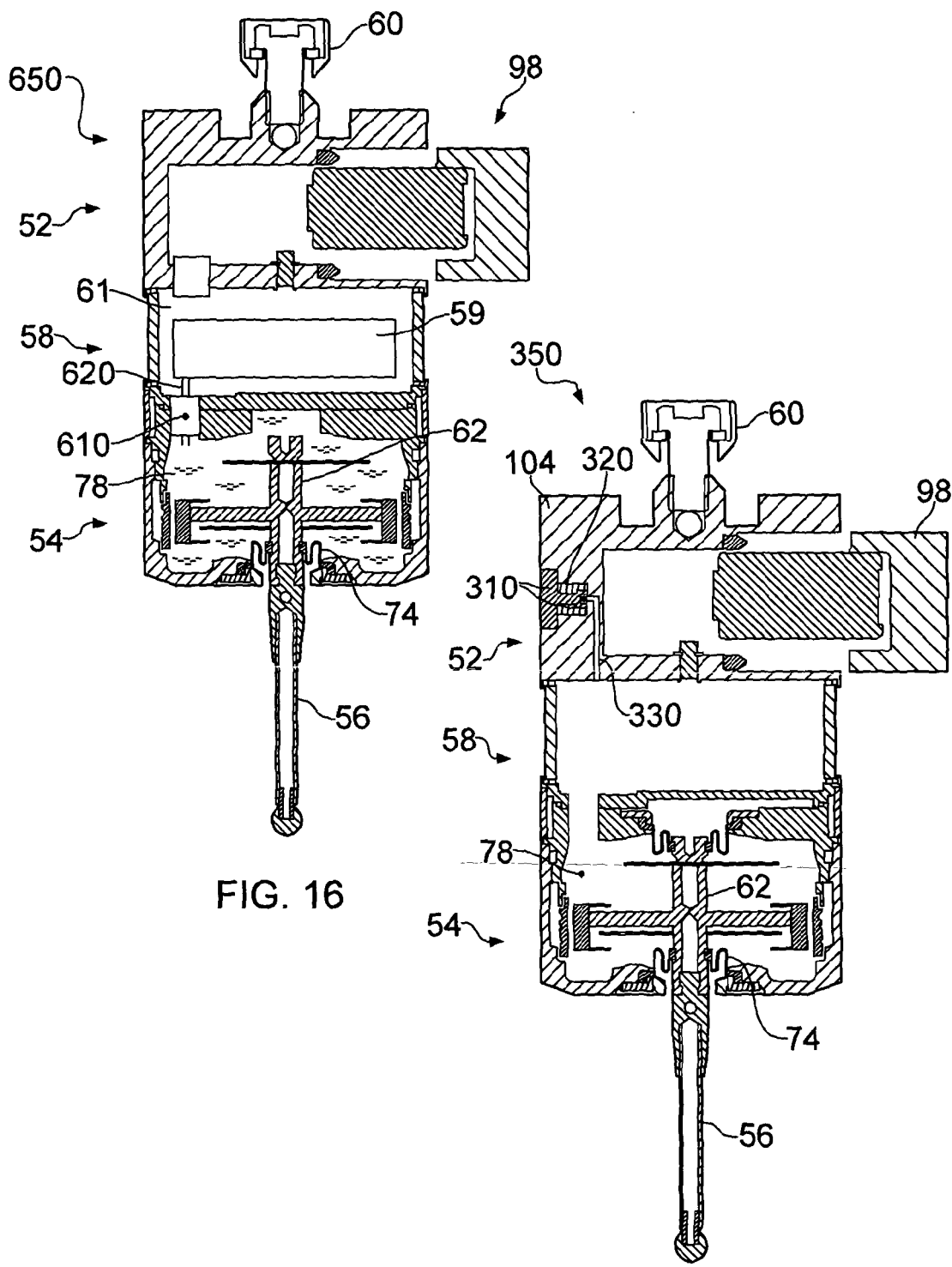

FIGS. 8a, b and c respectively show an isometric view of the sensor arrangement of the analogue probe shown in FIG. 2 in a rest position, in a vertically displaced arrangement and in a tilted arrangement;

FIG. 9a shows a planar cross-sectional view of the front sealing diaphragm of the analogue probe shown in FIG. 2;

FIG. 9b shows an isometric cross-sectional view of the front sealing diaphragm of the analogue probe shown in FIG. 2;

FIG. 9c shows an isometric view of the front sealing diaphragm of the analogue probe shown in FIG. 2;

FIG. 10 shows an isometric view of a port fluidly connecting the battery housing and the communications module of the analogue probe shown in FIG. 2;

FIG. 11 shows a cut-away isometric view of the analogue probe shown in FIG. 2;

FIG. 12 shows a cross-sectional view of an analogue probe according to a second embodiment of the invention;

FIG. 13 shows a cross-sectional view of an analogue probe according to a third embodiment of the invention;

FIG. 14 shows a cross-sectional view of an analogue probe according to a fourth embodiment of the invention;

FIG. 15 shows a cross-sectional view of an analogue probe according to a fifth embodiment of the invention; and FIG. 16 shows a cross-sectional view of an analogue probe according to a sixth embodiment of the invention.

Figure 1:
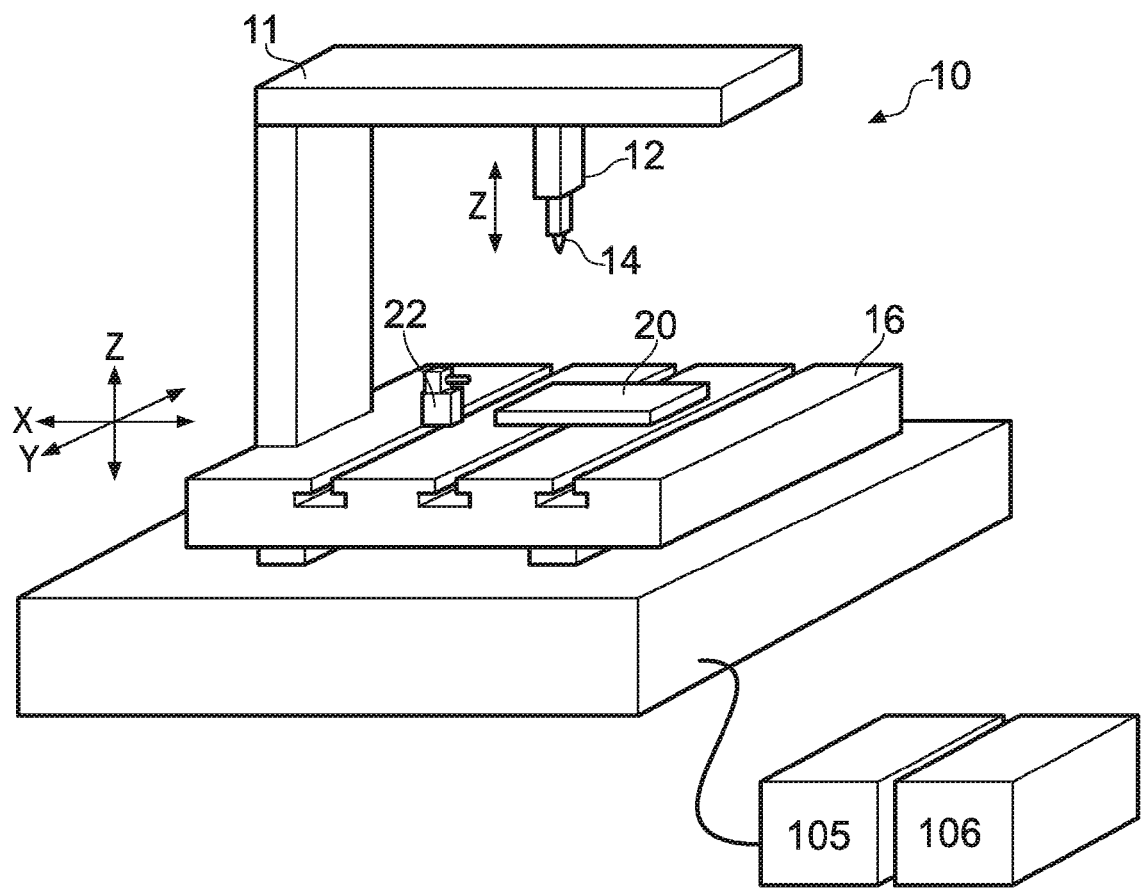
FIG. 1 shows an isometric view of a machine tool apparatus.

Referring to FIG. 1, a conventional machine tool apparatus 10 comprises a bed 16 on which a workpiece 20 and any machine tool accessories, such as a tool setter 22, may be mounted. The machine tool 10 also comprises a frame 11 which supports a spindle 12 into which a tool 14 can be mounted.

The spindle 12 and machine tool bed 16 are moveable relative to one another in three orthogonal directions X, Y and Z within a working volume of the machine tool apparatus 10. In this instance the spindle 12 and tool 14 may move in the Z direction, while the table can move in the X and Y directions. Such movement is effected by X, Y and Z drives (not shown) controlled by a machine controller 105 or any suitable computer or interface. Metrological scale reading apparatus (not shown) is provided on each of the X, Y and Z axes in order to measure the relative movement of the spindle 12 in each direction. The spindle 12 and bed 16 can therefore be moved accurately relative to one another in order to machine a workpiece. In an alternative embodiment frame 11 may be moveable in X, Y and Z, with the bed 16 remaining stationary. Indeed, as will be understood, any combination resulting in three degrees of freedom in movement of the tool 14 relative to the workpiece 20 is possible. Furthermore, at least one rotational degree of freedom of the spindle 12 and/or bed 16 could be provided. Other types of machine tool apparatus include lathes, grinders and milling machines, for example.

A machine tool apparatus 10 can be used both to machine and to measure workpieces. The tool 14 shown in FIG. 1, used to machine a workpiece, can be replaced by a measurement probe which can be used to measure the workpiece.

Typically touch-trigger measurement probes are used to measure workpieces in machine tools. Such touch-trigger probes comprise a housing with a workpiece-contacting stylus deflectable with respect to the housing. In a touch trigger probe, deflection of the stylus from a rest position causes a signal to indicate that the stylus has touched the surface of the workpiece. UK patent publication GB1445977 describes such a touch trigger probe.

Another type of measurement probe is an analogue measurement probe, also sometimes known as a scanning probe. In an analogue probe the extent of deflection of the probe can be measured as the stylus is moved along the surface of the workpiece. UK patent publication GB1551218 describes such an analogue measurement probe. An analogue measurement probe can be connected to a digital processor to give a digital output. Analogue measurement probes have typically previously been used for coordinate positioning apparatus such as coordinate measuring machines, which are used for measuring objects only, not for cutting a workpiece, and hence operate in a much cleaner environment which does not require the analogue probe to be sealed.

FIG. 2 shows an isometric view of an analogue measurement probe 50 according to the present invention. As shown, the analogue probe 50 of the described embodiment comprises at a first end a battery housing 52, a sensor housing 54 at a second end from which a workpiece contacting stylus 56 extends, and a communication module 58 between the battery housing 52 and sensor housing 54. A spindle mount 60 is also provided on the top of the battery housing 52 so that the analogue probe 50 can be mounted on the spindle 12.

Figure 3:
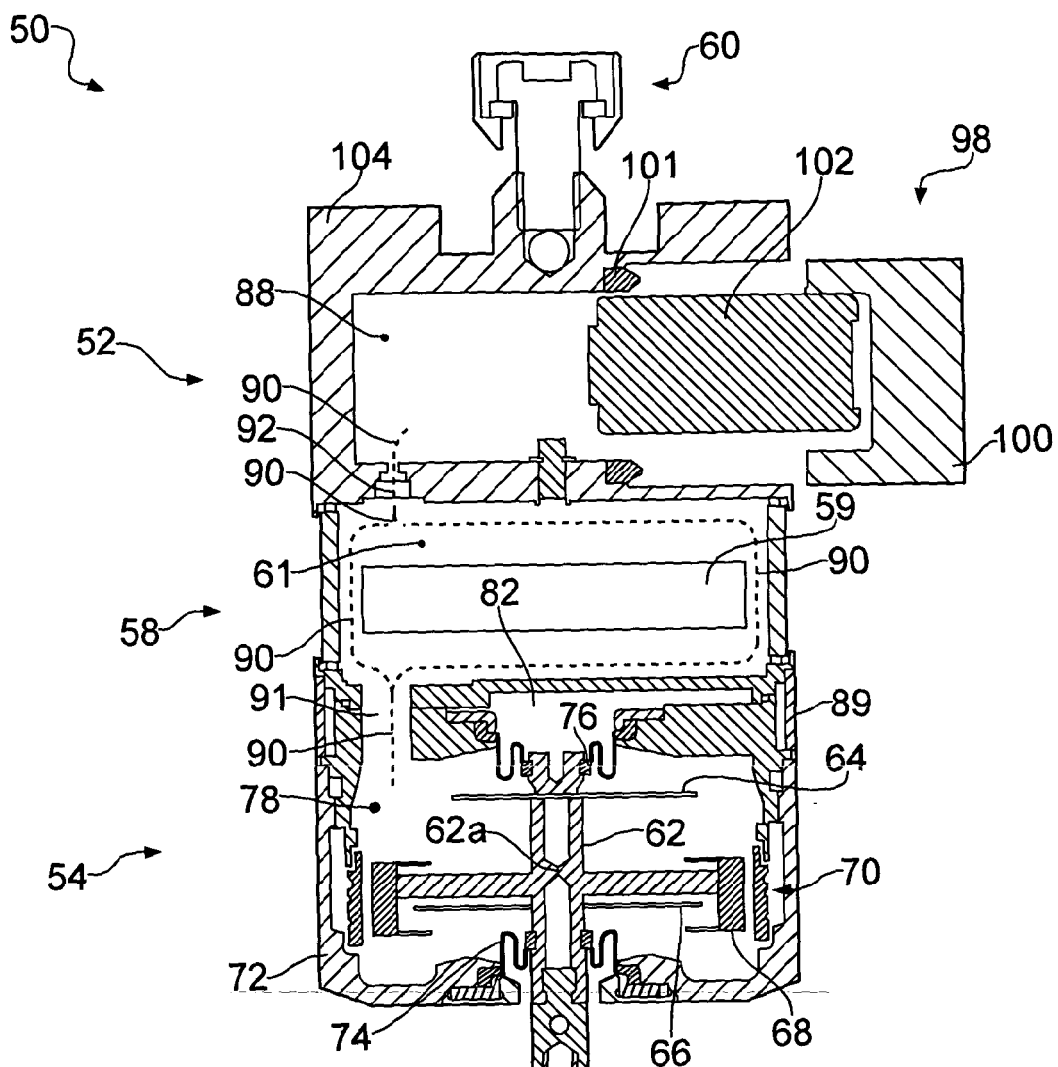
FIG. 3 shows a cross-sectional view of the analogue probe shown in FIG. 2, taken in a first plane.

FIG. 3 shows a cross-sectional view of the analogue measurement probe 50 taken in a first plane A shown in FIG. 2. As shown, the sensor housing 54 comprises an outer wall 72 within which a stylus holder 62 is mounted via a suspension mechanism comprising first 64 and second 66 planar springs (shown in more detail in FIG. 7) such that the stylus holder 62 is held in a suspended rest position. The workpiece-contacting stylus 56 is mounted at its first end to the stylus holder 62 via cooperating screw-threads (not shown) on each of the stylus 56 and stylus holder 62. As will be understood, in an alternative embodiment, the stylus 56 and stylus holder 62 can be formed as a single piece. The workpiece contacting stylus 56 comprises at its opposing second end a stylus ball 57. After calibration (explained in more detail below) the position of the geometrical centre of said stylus ball 57 is accurately known relative to a predetermined reference point on the spindle mount 60. As shown, in the embodiment described, the stylus holder 62 and hence the stylus 56 is held in a suspended rest position such that it is not biased against any stops when it is in its rest position. Accordingly, the stylus holder, and hence stylus, is free to move in both directions in each of its permitted degrees of freedom. For example, the stylus 56 can moved in directions into and out of the probe's sensor housing 54. In other words, the stylus holder 62/stylus 56 can be considered to be in a floating arrangement in that its rest position is not in a fixed place.

The sensor housing 54 further comprises first 68 and second 70 parts of a capacitance displacement sensor (explained in more detail below in connection with FIGS. 8a, b and c). The first part 68 of the capacitance displacement sensor is mounted to the stylus holder 62 so as to move with the stylus holder 62 and the second part 70 of the capacitance displacement sensor is mounted such that it is fixed to the outer wall 72 of the sensor housing 54. The first 68 and second 70 parts of the capacitance displacement sensor are spaced apart by a dielectric air gap.

Figure 4:
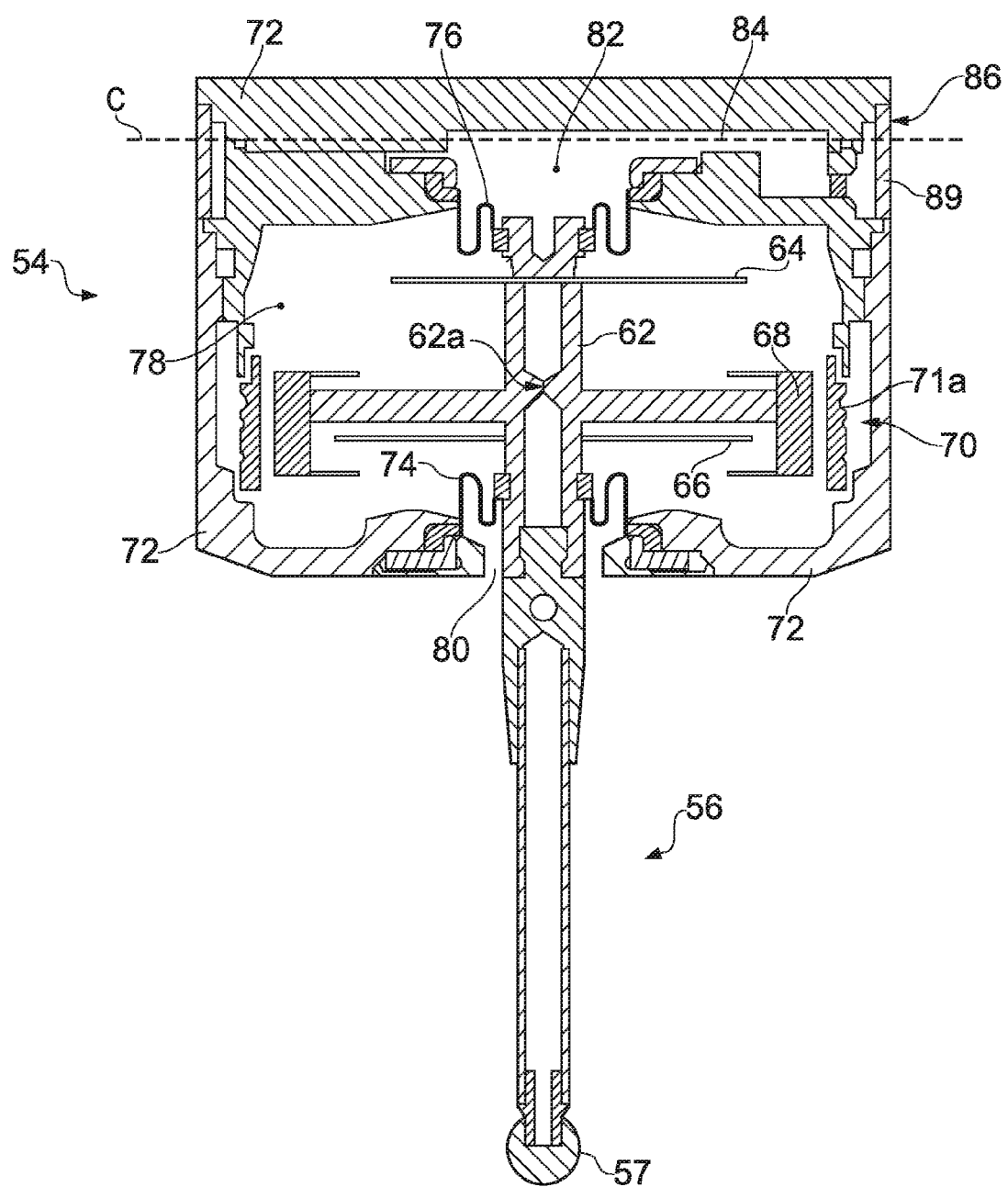
FIG. 4 shows a cross-sectional view of the sensor housing of the analogue probe shown in FIG. 2, taken in a second plane.

Referring now to FIG. 4, there is shown a cross-sectional view of the sensor housing 54 taken in a second plane B shown in FIG. 2. A first compliant sealing member 74 is provided which extends between the outer wall 72 of the sensor housing 54 and a first end of the stylus holder 62 proximal to the stylus 56. The first compliant sealing member 74 is in more detail in FIGS. 9a, b and c. In particular, as can be seen, the first compliant sealing member 74 extends annularly around the stylus holder 62, between the stylus holder 62 and the outer wall 72 of the sensor housing 54. Rather than being a flat annular disc, the first compliant sealing member 74 has an undulated, e.g. a convoluted, shape. Such a design provides a larger surface area, has been found to gives less hysteresis and allows a greater range of movement compared to just a flat disc.

Between the first compliant sealing member's 74 outer 108 and inner 110 edges (via which it is connected to the outer wall 72 and the stylus holder 62 respectively) the first compliant sealing member 74 comprises a peak 112 and a trough 114. The peak 112 and the trough 114 are substantially flat in shape. In particular, starting from the outer edge 108 at which the first compliant sealing member 74 is secured to the outer wall 72, the first compliant sealing member 74 extends substantially parallel to the length of the stylus holder 62, before bending back on itself for a first time and then a second time before the inner edge 110. Accordingly, the bends provide the peak 112 and the trough 114, and as shown and as already mentioned, the bends are substantially flat-bottomed U-shaped bends. Furthermore, it has been found that providing the peak 112 and trough 114, i.e. the bends, with flat faces as opposed to rounded faces, provides less resistance to movement of the stylus holder 62, and hence makes the first compliant sealing member 74 more flexible.

As shown in FIG. 9a, a conceptual plane D can be drawn through the first compliant sealing member 74 which extends substantially parallel to the lateral extent of the first compliant sealing member (and in this case perpendicular to the stylus holder 62) and which lies mid-way between the top and bottom extremes of the first compliant sealing member 74. In the embodiment described the outer edge 108 sits on a first lower side of the plane D whereas the inner edge sits on a second upper side of the plane D. Furthermore, the peak 112 sits on the second upper side of the plane D whereas the trough 114 sits on the first lower side of the plane D.

The first compliant sealing member 74 is moulded from a fluorocarbon rubber material. This material is flexible so as to minimise plastic deformation effects and thus minimise any hysteresis effects the diaphragms may have on movement of stylus holder. Fluorocarbon rubbers are also able to retain their mechanical properties over a large range of temperatures, in particular between 5° and 55°, and are resistant to degradation by such chemical solvents and coolants as are used in machine tool type environments. Additionally, the material is non-permeable. In general, the at least one of the first and second diaphragms may comprise an elastomer. In particular, at least one of the first and second diaphragms may comprise, for example, fluorocarbon rubber or a silicone rubber.

Referring back to FIG. 4, a second compliant sealing member 76 is provided which extends between the outer wall 72 of the sensor housing and a second end of the stylus holder 62, distal to the stylus 56. Together, the first compliant sealing member 74, the second compliant sealing member 76 and the outer wall 72 of the sensor housing 54 define a hermetically sealed first chamber 78 in which the first 68 and second 70 parts of the capacitance displacement sensor is located.

The first 74 and second 76 compliant sealing members have equal effective surface areas—which is the area on which a pressure force, due to the difference between the pressure in the first chamber 78 and the analogue probe's 50 operating environmental pressure, may act. As is the case in the described embodiment, this is achieved by the first 74 and second 76 compliant sealing members being substantially identical in shape and size. Furthermore, to ensure equal performance, the first 74 and second 76 compliant sealing members are made from the same material and have the same thickness as each other.

Depending on the particular configuration, the length of the probe may be taken into account when positioning the first 74 and second 76 compliant sealing members such that they may are connected to the stylus member 62 at unequal distances from the pivot point 62a (described in more detail below) of the stylus member as is the case in the present embodiment. However, it will be understood that it may be preferred that they are connected to the stylus member 62 at substantially equal distances from the pivot point 62a. Furthermore, it can be preferred if the first 74 and second 76 compliant sealing members are attached to the stylus member 62 as close as possible to the pivot point 62a to minimise any moment they impart on the stylus member.

Referring still to FIG. 4, a first side of the first compliant sealing member 74 is exposed to the first chamber 78 and a second side of the first compliant sealing member 74 is exposed to the analogue probe's 50 operating environment via an annular channel 80 between the outer wall 72 and the first end of the stylus holder 62. Also as shown in FIG. 4, a first side of the second compliant sealing member 76 is exposed to the first chamber 78 and a second side of the second compliant sealing member 76 is exposed to a second chamber 82 inside the sensor housing 54. The second chamber 82 is fluidly connected to the analogue probe's 50 operating environment via a first channel 84 which connects the second chamber 82 to an opening 86 in the outer wall 72. As shown in FIGS. 2 to 6 a solid annular cover 89 sits in a recess on the outside of the sensor housing's 54 outer wall 72 and covers the openings 86. The annular cover 89 is made to be slightly smaller than the recess such that gaps exist between the annular cover 89 and the outer wall 72 so as to allow the flow of gas to and from the openings 86. Furthermore, small recesses 95 are provided to aid such flow of gas. The annular cover 89 helps to stop a significant amount of contamination from reaching the opening 86 and hence the second chamber 82 which may affect the performance of the second compliant sealing member 76. As illustrated in FIG. 6, the annular cover 89 is provided in two parts 89a and 89b which are snap fitted together at their interfaces 89c so that they can easily be removed and replaced, e.g. for cleaning. However, this need not necessarily be the case. For instance the annular cover 89 could comprise a single ring.

Figure 5:
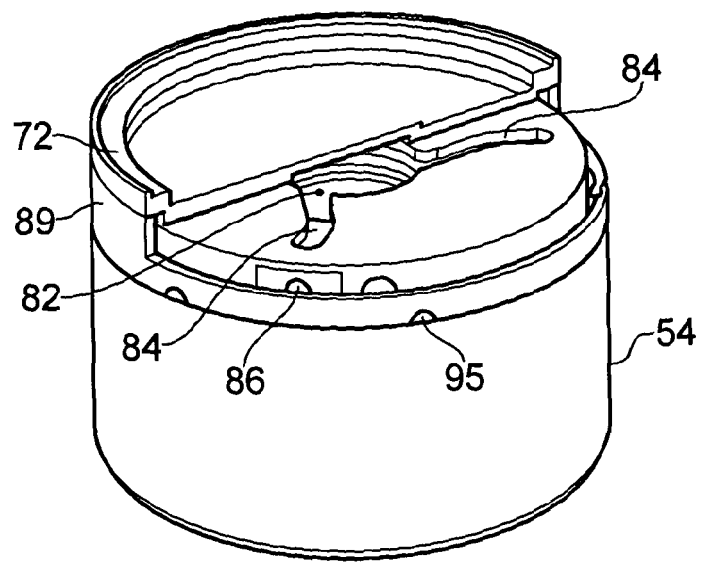
FIG. 5 shows an isometric view of the sensor housing of the analogue probe shown in FIG. 2.
Figure 6:
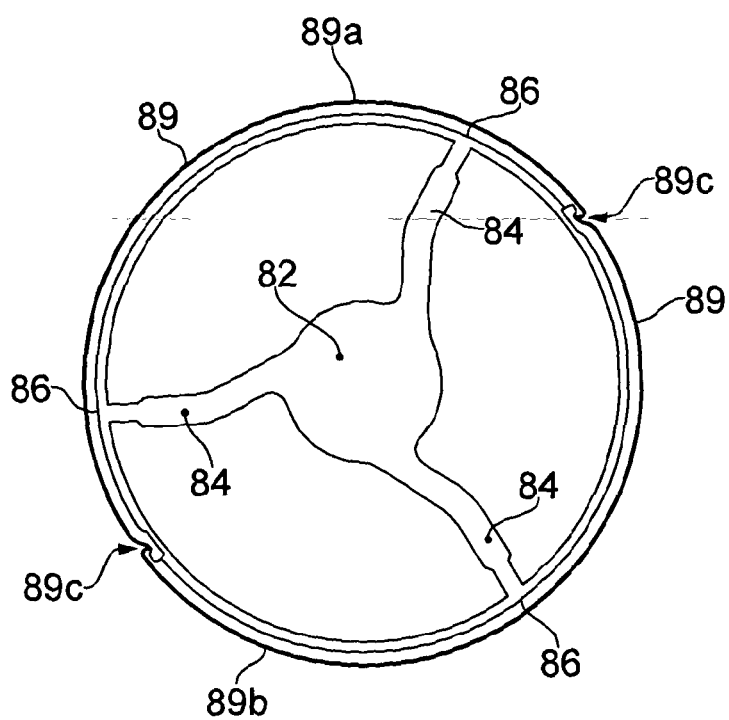
FIG. 6 shows a cross-sectional view of the sensor housing of the analogue probe shown in FIG. 2, taken in a third plane.

Although only one channel 84 and opening 86 is shown FIG. 4, as illustrated in FIG. 5 (which shows an isometric view of the sensor housing 54 with the top part of outer wall 72 and annular cover 89 being partially cut away) and FIG. 6 (which shows a schematic planar cross-sectional view of the sensor housing taken in the plane C shown in FIG. 4, looking down the length of the analogue probe), more than one channel 84 connecting the second chamber 82 to the analogue probe's operating environment via openings 86 is the outer wall 72 is provided. In fact, as illustrated in FIG. 6, three such channels 84 and openings 86 are provided. Accordingly, the second side of the second compliant sealing member 76 is fluidly connected to the analogue probe's 50 operating environment via these three channels 84 and openings 86.

Returning back to FIG. 3, as shown, the first chamber 78 is fluidly connected to a third chamber 88 in the battery housing 52, through the communications module 58 via the path illustrated by dashed line 90. As can be seen, the path 90 passes through a first port 91 between the sensor housing 72 and the communications module 58 and a second port 92 between the battery housing 52 and the communication module 58. The first port 91 can be a small, open, cylindrical tube through which wires (not shown) can also be passed between the first part of the sensor 68 and the communication module 58. The second port 92 is shown in more detail in FIG. 10 and comprises a star-shaped member 94 which has gaps between its central body and the edge of the second port 92 and an oleophobic membrane 96. The provision of the star-shaped member 94 helps to stop any solid objects reaching and damaging the oleophobic membrane 96. The oleophobic membrane 96 restricts the passage of liquids and solid particles from entering the communications module's 58 chamber 61, whilst still allowing the free passage of gases between the third chamber 88 in the battery housing 52 and the communications module's 58 chamber 61. Suitable membranes are known, and include for example oleophobic membranes. Alternatively or additionally the membrane may be hydrophobic. The membrane may be, for example, expanded Poly-tetrafluroethylene. Such suitable membranes include the GORE™ Membrane Vent, available from W.L. Gore & Associates.

As also shown in FIG. 3, there is provided a battery holder 98 having an end wall 100, for holding a battery 102. When the battery holder 98 is loaded into the battery housing 52, the terminals (not shown) on the battery 102 connect with power terminals (not shown) in the battery housing 52 such that the battery 102 supplies power to the analogue probe 50. The battery holder's 98 end wall 100 can be secured to the outer wall 104 of the battery housing 52 via a bayonet fitting (not shown) which can be turned between a locked and an unlocked position by turning the end wall 100. A screwdriver or other flat instrument, such as a coin, can be received in the slot 103 provided on the exterior of the end wall 100 (see FIG. 2) and subsequently used to turn the end wall 100 and hence fasten or release the bayonet fitting. Moreover, the end wall 100 of the battery holder 98 seals against the outer wall 104 of the battery housing 52 via an O-ring seal 101 provided in the battery housing 52 which mates and seals against the inside of the end wall 100 of the battery holder 98. Accordingly, when the battery holder 98 is loaded into the battery housing 52, no solids, liquids or gasses can pass between the third chamber 88 in the battery housing 52 and the analogue probe's operating environment. Accordingly, the first 68 and second 70 parts of the capacitance displacement sensor are then completely sealed inside the analogue probe's 50 first chamber 78 and safe from any contaminants in the analogue probe's 50 operating environment.

Accordingly, it can be seen that a vent between the first chamber 78 and the outside of the probe body, is provided by the first 91 and second 92 ports, and the chambers 61, 88 within the communications module 58 and battery housing 52; the vent's opening is provided by the removable and resealable end wall 100 of the battery holder 98. As shown, the vent's opening is positioned such that when it is opened, the first chamber 78 is exposed directly to the analogue probe's ambient (e.g. its immediate) operating environment.

Figure 7:
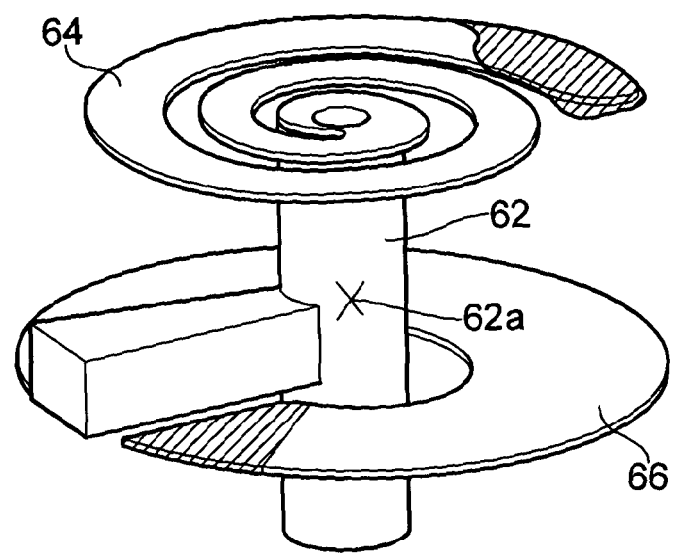
FIG. 7 shows an isometric view of the stylus holder suspension mechanism of the analogue probe shown in FIG. 2.

Referring now to FIG. 7, there is shown a schematic diagram of the suspension mechanism via which the stylus holder 62 is held in a suspended rest position within the sensor housing 52. In particular, the suspension mechanism comprises a first 64 coiled planar spring, a first end of which is fixed to the outer wall 72 of the sensor housing 52 (not shown in FIG. 6) and a second end of which is fastened to the stylus holder 62 towards a first end of the stylus holder's 62. The suspension mechanism further comprises a second C-shaped spring 66, a first end of which is fixed to the outer wall 72 of the sensor housing 52 (not shown in FIG. 6) and a second end of which is fastened to the stylus holder 62 towards a second end of the stylus holder 62. These first 64 and second 66 springs hold the stylus holder 62 in a suspended rest position when no external force is exerted on the stylus holder 62 (e.g. via a stylus 58 connected to the stylus holder) but also permit movement of the stylus holder 62 relative the sensor housing 52 on the application of an external force on the stylus holder 62. In particular, in the described embodiment, the first 64 and second 66 springs enable the stylus holder 62 to pivot about a first point 62a central to the stylus holder 62, and to translate in z (i.e. parallel to the length of the stylus holder 62). Furthermore, as described above the first 74 and second 76 compliant sealing members are flexible so as to provide minimal resistance to such relative movement of the stylus holder 62.

Referring to FIGS. 8*a*, *b* and *c*, there is shown a schematic isometric view of the sensor arrangement via which the above described displacement of the stylus holder 62 away from its suspended rest position can be measured. The second part 70 of the capacitive sensor is shown partially cut-away so that the first part 68 of the capacitive sensor can easily be seen. Furthermore, the stylus holder 62 to which the first part 68 of the capacitive sensor is fixed to move with, and the outer wall 72 of the sensor housing 54 to which the second part 70 of the capacitive sensor is fixed, are not shown to aid illustration of the capacitive sensor. In summary, when the stylus 56 is deflected on being brought into contact with a workpiece the stylus holder 62 and thus the first part 68 of the capacitance displacement sensor is moved relative to the second part 70 of the capacitance displacement sensor. FIG. 8*a* shows the relationship between the first 68 and second 70 parts of the capacitive sensor when the stylus holder 62 is in its rest position. FIGS. 8*b* and 8*c* respectively show example relationships between the first 68 and second 70 parts of the capacitive sensor during Z-axis displacement and tilting of the stylus member 62 relative to the sensor housing 54 due to contact of the stylus 56 with an object 20.

The second part 70 of the capacitive sensor comprises a top annular excitation ring 71*a* which is stacked above and electrically insulated from a bottom annular excitation ring 71*b*. These top 71*a* and bottom 71*b* annular excitation rings are driven with a quadrature signal, i.e. they are each driven by an AC signal, but the signal for the top 71*a* annular excitation ring is 90° out of phase from the bottom 71*b* annular excitation ring. The outer surface of the first part 68 of the capacitive sensor that faces the second part 70 comprises four segments of equal angular size (of which only two 69*a* and 69*b* are shown) preferably spaced at 90° intervals. When the first part 68 is aligned in the centre of the excitation ring 70 each segment 69*a*, 69*b* on the first part 68 sees an equal area of the top 71*a* and bottom 71*b* excitation rings and hence receives an equal signal contribution from each. Once the first part 68 moves as shown in FIG. 8*b* and FIG. 8*c* the areas of the top 71*a* and bottom 71*b* excitation ring seen by the segments 69*a*, 69*b* change and hence the signals received by the segments also change. These signals can be interpolated to determine the first part's 68 position. The specific details of the working of such a capacitance displacement sensor are well known and for instance are described in International Patent Application PCT/GB02/00413 (publication no. WO 02/061378), and so are not further described here.

In the described embodiment the displacement sensor is a capacitance sensor. As will be understood, other suitable displacement sensors exist, for example optical sensors or inductive sensors.

As schematically in FIG. 3, the communications module 58 comprises a transceiver 59 for wirelessly communicating with a processor unit 106 (see FIG. 1). The communication module 58 and receiver/processor unit 106 could communicate for example via radio or optical transmission techniques. The receiver/processor unit 106 can be configured to communicate with the communications module 58 so as to turn the analogue probe 50 on and also so as to receive measurement information from the analogue probe 50. The receiver/processor unit 106 could also be configured to send set-up information to the analogue probe 50 via the communications module 58. Although the receiver/processor unit 106 is shown as a separate unit to the machine controller 105, as will be understood they could be provided by a common processor unit or computer device. Furthermore, as will be understood, in alternative embodiments, wires could be fed from the receiver/processor unit 106 to the spindle 12 and connect with the analogue probe 50 via appropriate terminals provided by the spindle 12 and spindle mount 60 such that the communication module 58 could communicate with the receiver/processor unit 106 via such wires.

In use, but before the analogue probe 50 is loaded onto the machine tool apparatus 10, the battery holder 98 is removed from the battery housing 52 so that pressure in the first chamber 78 equalises with the machine tool apparatus' 10 operating environmental pressure via the vent provided by the first 91 and second 92 ports, and the chambers 61, 88 in the battery housing 52 and communication module 58. Indeed, the analogue probe 50 could be supplied to the customer with the battery holder 98 removed from the battery housing 52 so as to help ensure that the pressure in the first chamber 78 is set to the machine tool apparatus' 10 operating environmental pressure.

Once the battery holder 98 is loaded back into the battery housing 52, the analogue probe 50 can be loaded in the machine tool apparatus' 10 spindle 12 via its spindle mount 60. When first installed on the machine tool apparatus 10 the analogue probe 50 must be calibrated. This is achieved by conducting a series of scans on a calibration sphere (not shown) of known size at various probe deflections. Machine tool apparatus position and analogue probe deflections are then compared to produce a calibration matrix which can be used to determine the position of the centre of the stylus tip 57. The analogue probe 50 can then be moved via the machine tool apparatus' X, Y and Z axes under the control of the machine controller 105 so as to measure the workpiece 20 mounted on the machine tool apparatus' bed 16. The measuring operation can comprise bringing the stylus 58 into contact with the workpiece 20. As the probe is an analogue probe 50 the stylus 58 can be moved along the surface of the object 20 in constant contact with the object 20 and the extent of deflection of the stylus 58 relative to the sensor housing 54 can be measured. Indeed, deflection of the stylus 58 causes deflection of the stylus holder 62 away from its suspended rest position which in turn causes displacement of the first part 68 of the capacitive displacement sensor relative to the second part 70. The extent of such displacement is continuously detected by the first part 68 and can be continuously streamed to the processor unit 106 via the transceiver 59 in the communications module 58.

If the analogue probe's 50 operating environmental pressure, or the first chamber's 78 pressure, changes whilst the first chamber 78 is sealed then there will be a pressure difference between the first chamber 78 and the analogue probe's 50 operating environment. For example, the analogue probe's 50 operating environmental pressure could drop. In this case, as the pressure inside the first chamber 78 is greater than the analogue probe's 50 operating environmental pressure, the force on the first side of the first compliant member 74 will be greater than the force on its second side. The pressure inside the first chamber 78 will therefore try to push the first compliant sealing member 74 out of the sensor housing 54. As the first compliant sealing member 74 is secured to the stylus holder 62, the first compliant sealing member 74 will in this case exert a force on the stylus holder which tries to pull the stylus holder 62 away from its rest position. In particular, the force will try to move the stylus holder 62 out of the sensor housing 54 in the Z-dimension. However, the second compliant sealing member 76 opposes such movement away from the rest position. This is because the second compliant sealing member 74 is also connected to the stylus holder 62 and is exposed on its second side to the second chamber 82 which sits at the analogue probe's 50 operating environmental pressure. Accordingly, the pressure inside the first chamber 78 will also pull against the second compliant sealing member 76 which in turn will try to push the stylus holder 62 away from its rest position, and in particular, will try to pull the stylus holder 62 further into the sensor housing 54 in the Z-dimension. Accordingly, the second compliant sealing member 76 is effectively passively monitoring the analogue probe's operating environment pressure and responds by exerting a force on the stylus member which opposes the force exerted on the stylus member by the first compliant sealing member 74. Accordingly, the second compliant sealing member 76 is acting as a suppressor which suppresses movement of the stylus member away from its suspended rest position induced by changes in the chamber's internal pressure and/or changes in the analogue probe's operating environment, or in other words is a compensation member which counteracts the force acting on the stylus member, due to pressure induced forces on the first compliant sealing member 74.

Furthermore, as the first 74 and second 76 compliant sealing members have the same effective surface areas, the force exerted on them will be the substantially the same. Accordingly, they will each exert substantially the same magnitude of force on the stylus holder 62, but in substantially opposite directions. The second compliant sealing member 74 therefore adapts to changes in the analogue probe's 50 operating environmental pressure so as to hold the stylus holder 62 against movement away from its suspended rest position despite the change in pressure in the analogue probe's 50 operating environment. The above set-up has been found to be effective at preventing movement of the stylus holder 62 away from its suspended rest position throughout a range of analogue probe operating environment pressures. For example, it has been found to be effective at substantially preventing pressure-induced movement of the stylus holder 62 despite deviations in the analogue probe's operating environment pressure (from the pressure at the time the analogue probe was sealed) up to +/−90 mbar.

As will be understood, should the analogue probe's 50 operating environment pressure change significantly from when first chamber 78 was sealed (by the loading of the battery holder 98 into the battery housing 52) then the force on the first 74 and second 76 compliant sealing members could be so great as to cause them to buckle, i.e. distort, out of shape. They should distort in a substantially uniform manner and hence the stylus holder 62 should not move substantially from its suspended rest position. However, as described above the first 74 and second 76 compliant sealing members are shaped and designed so as to provide minimal resistance to displacement of the stylus holder 62 due to deflections caused by contact of the stylus 56 with an object. Such distortion could mean that this is no longer the case, and hence such distortion should be avoided. Such distortion could be avoided by equalising the pressure in the first chamber 78 with the analogue probe's 50 operating environmental pressure. This can be achieved by removing the battery holder 98 from the battery housing 52 thereby allowing the pressure to equalise via the path schematically illustrated via the dashed line 90, described in more detail above. Such equalising of the pressure could be performed at regular intervals. Optionally, the analogue probe's 50 operating environmental pressure could be monitored and in the event of a significant pressure change a signal could be indicated to the operator that equalising of the pressure is required. For example, an LED could be provided on the analogue probe 50 which could be operated in a particular manner to signal to operator that pressure equalisation is advisable.

In the above described embodiment, movement of the stylus holder 62 away from its suspended rest position due to pressure forces on the first compliant sealing member 74 is opposed by the provision of the second compliant sealing member 76. As will be understood, such opposition to the movement could be achieved in various other ways. For instance, a powered mechanism could be used to exert a force on the stylus holder 62 opposite to that which is exerted by the first compliant sealing member 74. For example, instead of (or even in addition to) the second compliant sealing member 76, the stylus holder could be made from a magnetic material and an electromagnet could be located to act on the second end of the stylus holder. In the event of a change in the analogue probe's 50 operating environmental pressure, then in order to avoid movement of the stylus holder 62, the power of the electromagnet could be adjusted so as to exert a greater or weaker (depending on whether the pressure has decreased or increased) force on the stylus holder 62. As will be understood, other mechanisms could also be used to provide a controllable varying force on the stylus holder 62, for instance a spring, such as a voice coil, could be connected to the stylus member and operated to control the position of the stylus member. Furthermore, in the embodiment described, at least one of the first 64 and second 66 planar springs could be configured such that its position and/or the force it exerts on the stylus holder 62 can be adapted in response to changes in pressure so as to oppose pressure-induced movement of the stylus holder 62 away from its suspended rest position.

FIGS. 12 to 16 show further embodiments according to the present invention. As can be seen these embodiments share many identical parts with the embodiments described above and so like part share like reference numerals.

In the embodiment shown in FIG. 12, there is no second compliant sealing member 76. Instead, an enlarged third chamber 288 is provided in the battery housing 52 which is sealed from the communications module's 58 chamber 61 and hence the sensor housing's 54 first chamber 78. Furthermore, a pump 210 is provided between the third chamber 288 and the communications module's 58 chamber 61. Accordingly, the third chamber 288 is essentially a reserve chamber into and out of which gas can be exchanged between it and the communication module's 58 chamber 61 and the first chamber 78 so as to regulate the pressure within the communications module's 58 chamber 61 and the first chamber 78. This could be done so as to maintain a certain pressure difference across the first compliant sealing member 74. Depending on the particular embodiment, this could be done, for example, in order to ensure that the pressure within the first chamber 78 is substantially the same as the analogue probe's 250 environmental pressure (i.e. so that there is substantially no pressure difference). Pumps suitable for use with the described embodiment include positive displacement type pumps, including for example peristaltic or piston pumps. Accordingly, the pump and chamber are acting as a suppressor/compensation member.

As will be understood, in such an embodiment, the analogue probe's 250 environmental pressure could be monitored directly by the analogue probe 250 itself, or by a device external to the analogue probe. For example, a pressure sensor could be mounted anywhere in machine tool apparatus' 10 operating environment and any changes in pressure could be signalled to the analogue probe 250 via the processor unit 106 and the communications module 58. Furthermore, the pressure of gas within the communications module's 58 chamber 61 and the first chamber 78 could also be monitored and used so as to control the operation of the pump 210.

FIG. 13 shows a further alternative embodiment of an analogue probe 550 according to the present invention. As with the embodiment shown in FIG. 12 no second compliant sealing member is provided. Instead a piston 510 is provided, the position of which can be adjusted along the axis of the probe (i.e. in the dimension illustrated by arrow Z) by operation of a motor 520 so as to adjust the combined volume of the communications module's 58 chamber 61 and the first chamber 78 which is fluidly connected thereto, and thereby act as a suppressor/compensation member. Accordingly, the volume of the sealed chamber can be adjusted to regulate the pressure within the sealed chamber 78. Again, this could be in response to a signal from a device measuring the pressure (or any other factor indicative of pressure (e.g. temperature)) within the sealed chamber of the analogue probe's operating environment's atmospheric pressure. In an alternative embodiment, the piston 510 could be moveable manually (in addition or alternatively to being able to be moved automatically by for example the motor). For instance, an external slider could be provided that is connected to the piston which can be manipulated by a user so as to adjust the position of the piston. The slider could even be moved by engaging the slider with a feature on the machine tool and relatively moving the probe relative to the feature so as to cause movement of the slider. As will be understood, there are further optional ways of adjusting the volume of the sealed chamber. For instance, a section of the probe could be telescopic, the expansion/contraction of which affects the volume of the sealed chamber. In particular, a syringe mechanism could be provided which can be adjusted to alter the volume of the sealed chamber. Again, such telescopic mechanisms could be operated manually and/or automatically. As will be understood, it can be preferred that any moving parts or seals are independent of the metrology loop so as to avoid the need for recalibration after a volume change. Furthermore, preferably any moving parts of such embodiments should have high friction and/or a separate locking device to prevent movement after adjustment.

Optionally, with the probe loaded into the machine spindle and before operation, the pressure of the analogue probe's operation environment could be taken and referenced to an initial calibration recording. The difference in the readings could be used to establish the probe internal pressure reading (or indeed via an internal pressure transducer). Where the change in pressure is above a normal desired operation tolerance band, the sealed chamber's volume can either be manually adjusted or automated as described above.

In the embodiments described above, the vent requires removal of the battery holder 98 so as to allow equalisation of the pressure within the chamber with the analogue probe's operating environment's atmospheric pressure. In other embodiments, other additional or alternative vent mechanisms can be provided for enabling such equalisation of pressure. For instance, as shown in FIG. 14 the stylus holder 62 could provide a conduit 410 between the first chamber 78 and the analogue probe's operating environment which is sealed by the top end of the stylus 56 (the end of the stylus 56 distal to the stylus ball 57) pressing against an O-ring seal 420 in the stylus holder 62 when the stylus 56 is mounted onto the stylus holder 62. Accordingly, venting and equalisation of the pressure can be effected by removal or loosening of the stylus 56 from the stylus holder 62.

In these above described embodiments, the vent's opening is provided by the removal or loosening of a part of the analogue probe 50, 250, 450 which is required for operation of the analogue probe of the described embodiments. I.e. in the particular embodiments described the analogue probe cannot operate without the battery or the stylus 56. However, this need not necessarily be the case. For instance, the vent's opening could be provided by an opening in the outer wall 72 of the sensor housing 54 which can be sealed by a plug or other suitable valve.

For example, as shown in FIG. 15, a plug 310 can be provided in an opening in the battery housing's 52 outer wall 104 which is fluidly connected to the communications module's 58 chamber 61 and hence the first chamber 78 via a channel 330. A spring 320 can be provided which is configured to pull the plug 310 into the opening so as to seal the channel 330 from external contaminants. In the embodiment described, the plug 310 and spring 320 are configured such that when the analogue probe 350 is spun at 500 rpm (via the machine tool's spindle in which the analogue probe 350 is mounted via its spindle mount 60), the plug 310 is forced out of the opening due to centrifugal forces and hence the vent is opened allowing the pressure within the first chamber 78 to equalise with the analogue probe's operating atmospheric pressure. Not only can this be a simple way to open the vent without manual intervention, but the spinning of the analogue probe can throw liquid off the analogue probe and help prevent the ingress of external contaminants into the analogue probe via the channel 330.

In further embodiments, the vent could be one that can be opened automatically in response to circumstances that indicate that pressure equalisation is desirable. Such a configuration is particularly suitable when the vent's opening is provided by the removal or loosening of a part of the analogue probe which is not required for the operation of the analogue probe. For example, this could occur in response to a detected change in the pressure difference between the chamber and the analogue probe's operating environment. The change could be detected by the analogue probe itself or by a device external to the analogue probe which can signal to the analogue probe to open the vent. For instance, the device could comprise a pressure sensor (for example, a barometer or the like) as described above. This could be configured to occur only at stages at which the analogue probe is unlikely to be exposed to contaminants which could enter the chamber when the vent is open; for instance during set up and/or a calibration routine.

FIG. 16 shows a further alternative embodiment of an analogue probe 650 according to the present invention, in which no second compliant sealing member is provided. Rather, in this embodiment the first chamber 78 is filled with a liquid instead of a gas. The first chamber 78 is sealed from the communication module's 58 chamber 61 by a plug 610 so that the liquid is retained within the first chamber 78. As schematically shown, cables 620 extend through the plug 610 so that the sensor 68, 70 is connected to the componentry (e.g. transceiver 59) in the communications module 58. As liquids are substantially less compressible than gases, the liquid will prevent movement of the first compliant sealing member 74 due to changes in the analogue probe's 650 operating environment's atmospheric pressure and hence acts as a suppressor. Of course, as will be understood, the liquid should have good dielectric properties, for example, having a dissipation factor of at least $10^{-4}$. Preferably the low liquid has low viscosity, for example, not more than 60 centistokes, and for example in the range of 20-60 centistokes. Preferably its viscosity is stable with temperature changes. Suitable liquids include electrically insulating liquids, having good dielectric properties with low viscosity that is stable with temperature, and for example include various silicone fluids, including silicone oils, such as Polydimethlysiloxane. Such silicone fluids such as 200® Fluid and Xiameter® PMX-561 Trans Liquid are available from Dow Corning®.

The workpiece 20 to be measured with any of the above described analogue probes may have been machined on the machine tool apparatus 10 prior to being inspected with the analogue probe 50. The workpiece 20 may be machined on the machine tool simultaneously to being inspected with the analogue probe 50, if for example, the machine tool apparatus 10 has at least two spindles 12.

The invention claimed is:

1. An analogue probe for a machine tool apparatus, comprising:
   a probe body;
   a stylus member movably secured to the probe body;
   a sensor that measures an extent of displacement of the stylus member relative to the probe body, in which the sensor is contained within a chamber in the probe body; and
   a vent between the chamber and the outside of the probe body, configured such that when the vent is open the pressure within the chamber can equalise with the ambient pressure outside the probe body, and further configured such that an opening of the vent to the outside of the probe body can be closed so as to seal the chamber and therefore the sensor from external contaminants during operation of the analogue probe.

2. An analogue probe as claimed in claim 1, further comprising a plug that seals the vent's opening.

3. An analogue probe as claimed in claim 2, wherein the plug comprises a part of the analogue probe required for operation of the analogue probe.

4. An analogue probe as claimed in claim 2, wherein the vent's opening provides access to an area within the probe body to house an electronic component.

5. An analogue probe as claimed in claim 4, wherein when released, the vent's opening provides access to a battery chamber.

6. An analogue probe as claimed claim 2, wherein the plug comprises a part configured to retain at least one battery within the analogue probe.

7. An analogue probe as claimed in claim 1, further comprising a port between the sealed chamber and the vent's opening.

8. An analogue probe as claimed in claim 7, wherein the port comprises a membrane that restricts solid contaminants from entering the sealed chamber.

9. An analogue probe as claimed in claim 1, wherein the vent comprises a centrifugally operated vent which is configured to open on spinning of the analogue probe above a predetermined rotational speed.

10. An analogue probe as claimed in claim 1, further comprising an actuator that opens the vent in response to a signal from a processor device.

11. An analogue probe as claimed in claim 10, wherein the analogue probe comprises the processor device.

12. An analogue probe as claimed in claim 1, wherein the analogue probe comprises a suppressor that suppresses movement of the stylus member away from a suspended rest position that is induced by at least one of changes in the chamber's internal pressure and changes in the ambient pressure outside the probe body when the vent's opening is closed.

13. An analogue probe as claimed in claim 1, wherein the stylus member is movably secured to the probe body in a suspended rest position.

14. A method of operating an analogue probe for a machine tool apparatus which comprises (i) a probe body, (ii) a stylus member movably secured to the probe body, (iii) a sensor that measures an extent of displacement of the stylus member relative to the probe body, in which the sensor is contained within a chamber in the probe body, and (iv) a vent between the chamber and the outside of the probe body, the method comprising:
   opening the vent so as to equalise the pressure within the chamber with the ambient pressure outside the probe body; and
   closing the vent so as to seal the chamber and therefore the sensor from external contaminants.

15. A method as claimed in claim 14, wherein opening the vent comprises at least loosening a part of the analogue probe that is required for operation of the analogue probe.

16. A method as claimed in claim 15, wherein opening the vent comprises at least partially removing a battery from within the analogue probe.

17. A method as claimed in claim 14, wherein:
   the vent is configured such that it can be opened under centrifugal force, and
   the method comprises spinning the analogue probe so as to open the vent.

18. A method of operating an analogue probe for a machine tool apparatus which comprises (i) a probe body, (ii) a stylus member movably secured to the probe body, (iii) a sensor that measures an extent of displacement of the stylus member relative to the probe body, in which the sensor is contained within a chamber in the probe body, and (iv) a vent between the chamber and the outside of the probe body which when open enables the pressure within the chamber to equalise with the ambient pressure outside the probe body, the method comprising:
   closing the vent when the analogue probe is in its intended operating environment so as to seal the chamber at a pressure substantially equal to the ambient pressure outside the probe body and also seal the sensor from external contaminants.

19. An analogue probe for a machine tool apparatus, comprising:
   a probe body;
   a stylus member movably secured to the probe body;
   a sensor that measures an extent of displacement of the stylus member relative to the probe body, in which the sensor is contained within a chamber in the probe body; and
   a vent between the chamber and the outside of the probe body, configured such that when the vent is open the pressure within the chamber can equalise with the ambient pressure outside the probe body, and further configured such that an opening of the vent to the outside of the probe body can be closed so as to seal the chamber and therefore the sensor from external contaminants during operation of the analogue probe,
   wherein the vent comprises a plug for sealing the vent's opening, and the plug comprises a part of the analogue probe that is required for operation of the analogue probe.

20. An analogue probe for a machine tool apparatus, comprising:
- a probe body;
- a stylus member movably secured to the probe body;
- a sensor that measures an extent of displacement of the stylus member relative to the probe body, in which the sensor is contained within a chamber in the probe body; and
- a vent between the chamber and the outside of the probe body, configured such that when the vent is open the pressure within the chamber can equalise with the ambient pressure outside the probe body, and further configured such that an opening of the vent to the outside of the probe body can be closed so as to seal the chamber and therefore the sensor from external contaminants during operation of the analogue probe,
- wherein the vent comprises a plug that seals the vent's opening, and the plug comprises a part that retains at least one battery within the analogue probe.

* * * * *